(12) United States Patent
Guan et al.

(10) Patent No.: US 9,751,241 B2
(45) Date of Patent: Sep. 5, 2017

(54) FOAM GASKET AND BONDING TAPE BASED ON POLYURETHANE DISPERSIONS

(71) Applicant: Saint-Gobain Performance Plastics Corporation, Solon, OH (US)

(72) Inventors: Jing Guan, Shanghai (CN); Yue Dong, Shanghai (CN); Georges Moineau, Battice (BE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 157 days.

(21) Appl. No.: 14/300,813

(22) Filed: Jun. 10, 2014

(65) Prior Publication Data

US 2014/0367926 A1 Dec. 18, 2014

Related U.S. Application Data

(60) Provisional application No. 61/858,019, filed on Jul. 24, 2013.

(30) Foreign Application Priority Data

Jun. 13, 2013 (CN) .......................... 2013 1 0233653

(51) Int. Cl.
 *B29C 39/12* (2006.01)
 *B29C 39/20* (2006.01)
 (Continued)

(52) U.S. Cl.
 CPC ............ *B29C 39/203* (2013.01); *B29C 39/18* (2013.01); *B29K 2075/00* (2013.01);
 (Continued)

(58) Field of Classification Search
 CPC .......... F16J 15/10; F16J 15/102; F16J 15/108; B29K 2075/00; B29K 2075/007;
 (Continued)

(56) References Cited

U.S. PATENT DOCUMENTS

| 3,989,869 | A | 11/1976 | Neumaier et al. |
| 5,658,630 | A | 8/1997 | Shizukuda et al. |

(Continued)

FOREIGN PATENT DOCUMENTS

| CN | 1386091 A | 12/2002 |
| CN | 1732082 A | 2/2006 |

(Continued)

OTHER PUBLICATIONS

The International Search Report received from the International Searching Authority (ISA/CN) for International Application No. PCT/CN2012/001765 dated Oct. 3, 2013, 4 pages.

(Continued)

*Primary Examiner* — Gilbert Lee
(74) *Attorney, Agent, or Firm* — Abel Law Group, LLP; Thomas H. Osborn

(57) ABSTRACT

A polymer sheet includes a polyurethane core. The polyurethane core has a first major surface and a second major surface opposite the first major surface. The polymer sheet can have at least one functional layer overlying a major surface. The polymer sheet has a thickness $t_{PS}$. The polyurethane core has a thickness $t_{PC}$. In embodiments $t_{PC}$ can be at least 0.3 $t_{PS}$. The polyurethane core can have at least one of the following property:
 (i) a Scratch Resistance Rating, as further described herein, of not greater than about 10 wt %,
 (ii) an elongation at break of at least 200%,
 (iii) a tensile strength at break of at least 0.3 MPa,
 (iv) a loss of tensile strength of not greater than about 30% when exposed to UV light according to standard SAE J1960 (Rev. August 2003).
The polymer sheet can be used for gaskets or bonding tapes.

20 Claims, 7 Drawing Sheets

(51) Int. Cl.
*B29C 39/18* (2006.01)
*B29K 75/00* (2006.01)
*B29L 7/00* (2006.01)
*B29L 9/00* (2006.01)
*B29L 31/26* (2006.01)

(52) U.S. Cl.
CPC ............. *B29K 2995/0077* (2013.01); *B29K 2995/0087* (2013.01); *B29L 2007/002* (2013.01); *B29L 2009/005* (2013.01); *B29L 2031/265* (2013.01); *Y10T 428/1452* (2015.01); *Y10T 428/1457* (2015.01); *Y10T 428/1462* (2015.01); *Y10T 428/1476* (2015.01); *Y10T 428/2495* (2015.01)

(58) Field of Classification Search
CPC ....... B29K 2075/0087; B29L 2007/002; B29L 2009/005; B29L 2031/265; B29C 39/18; B29C 39/203
See application file for complete search history.

(56) References Cited

U.S. PATENT DOCUMENTS

| | | | |
|---|---|---|---|
| 5,770,674 A * | 6/1998 | Cageao | C08G 18/2805 156/107 |
| 6,271,276 B1 | 8/2001 | Gribble et al. | |
| 6,369,178 B1 * | 4/2002 | McCarthy | C08F 214/04 526/242 |
| 6,915,741 B2 | 7/2005 | Price et al. | |
| 2004/0157035 A1 | 8/2004 | Guizzetti et al. | |
| 2005/0248102 A1 * | 11/2005 | Sato | C08G 18/6674 277/650 |
| 2006/0079589 A1 | 4/2006 | Tadokoro et al. | |
| 2007/0015424 A1 | 1/2007 | Toas et al. | |
| 2007/0104942 A1 | 5/2007 | Lewin et al. | |
| 2008/0280040 A1 * | 11/2008 | Barrall | F16J 15/104 427/256 |
| 2009/0145542 A1 | 6/2009 | Zoller | |
| 2011/0020549 A1 | 1/2011 | Comert et al. | |
| 2011/0120038 A1 * | 5/2011 | Wormann | E04B 1/6812 52/309.4 |
| 2011/0313100 A1 | 12/2011 | Morikami et al. | |
| 2012/0009401 A1 | 1/2012 | McCoy et al. | |
| 2012/0011656 A1 | 1/2012 | Daly | |
| 2012/0065336 A1 * | 3/2012 | Mizori | C08K 5/37 525/301 |
| 2012/0084896 A1 | 4/2012 | Wyner et al. | |
| 2012/0114930 A1 | 5/2012 | Yamamoto et al. | |
| 2012/0127392 A1 | 5/2012 | Oohira | |
| 2012/0159880 A1 | 6/2012 | Veilleux et al. | |
| 2013/0171896 A1 | 7/2013 | Hanada et al. | |
| 2013/0236672 A1 | 9/2013 | Kim et al. | |
| 2014/0044960 A1 | 2/2014 | Guenzler et al. | |
| 2015/0086730 A1 | 3/2015 | Guan et al. | |
| 2016/0304750 A1 | 10/2016 | Gao et al. | |

FOREIGN PATENT DOCUMENTS

| | | |
|---|---|---|
| CN | 101850639 A | 10/2010 |
| CN | 102438486 A | 5/2012 |
| CN | 102985507 A | 3/2013 |
| CN | 103153602 A | 6/2013 |
| CN | 104228246 A | 12/2014 |
| EP | 0917419 A1 | 5/1999 |
| EP | 1235473 A1 | 8/2002 |
| EP | 2612886 A1 | 7/2013 |
| JP | 2008006592 A | 1/2008 |
| JP | 2010247532 A | 11/2010 |
| KR | 20130098717 A | 9/2013 |
| TW | 201038602 A | 11/2011 |
| TW | 201221605 A | 6/2012 |
| WO | 2012006543 A2 | 1/2012 |
| WO | 2014201006 A1 | 12/2014 |

OTHER PUBLICATIONS

The International Search Report and the Written Opinion received from the International Searching Authority (ISA/KR) for International Application No. PCT/US2014/041714, dated Oct. 1, 2014, 12 pages.
European Search Report from EP14186239 dated Mar. 18, 2015, 1 page.
Pan, Guangquan, "Pro/Engineer Mobile Phone Structural Design Manual," Chinese Mobile Phone Research and Development Network, dated Mar. 2007, 5 pages.
Zeng, Liming, "Functional Composite Materials and Applications Thereof," 21st Century Composite Material Application Technology Series, dated Jan. 31, 2007, 7 pages.

\* cited by examiner

FOAM GASKET AND BONDING TAPE BASED ON POLYURETHANE DISPERSIONS

CROSS-REFERENCE TO RELATED APPLICATIONS

The present application claims priority under 35 U.S.C. §119(b) to Chinese Patent Application No. 201310233653.X, filed Jun. 13, 2013, entitled "FOAM GASKET AND BONDING TAPE BASED ON POLYURETHANE DISPERSIONS," naming as inventors Jing Guan, Yue Dong and Georges Moineau, and under 35 U.S.C. §119(e) to U.S. Provisional Patent Application No. 61/858,019, filed Jul. 24, 2013, entitled "FOAM GASKET AND BONDING TAPE BASED ON POLYURETHANE DISPERSIONS," naming as inventors Jing Guan, Yue Dong and Georges Moineau, both of which are assigned to the current assignee hereof and incorporated herein by reference in their entireties.

FIELD OF THE DISCLOSURE

This disclosure in general relates to polyurethane foam products and in particular to gaskets and bonding tapes.

BACKGROUND

Demand for electronic products has been increasing at an ever accelerating rate. In particular, demand for mobile electronic devices, such as telephones, game consoles, music players, flat screen televisions, laptop computers, and tablet computers, are becoming more prevalent in society than ever before. Such electronic devices and in particular, such mobile electronic devices can be damaged easily when exposed to environmental conditions, particularly humidity or moisture.

Typical electronic devices are housed within a casing formed in several sections that fit together and are secured by screws or by compression fittings. Such casings generally utilize gaskets to at least partially isolate the inside of the casing from the external environment.

In the mobile electronic devices industry, there is increasing pressure to reduce the weight and cost associated with devices. Oftentimes, the industry turns to lighter materials, such as plastics for the casings and seeks to use lighter materials for the gaskets and other components. However, thin-walled plastic casings can exhibit some degree of flexibility, placing additional strain on gaskets. Conventional gaskets that have poor response to repeated compression can fail to reform a seal between the casing portions after stress in adequate time to prevent dust and particulate from entering the device. Accumulation of dust and particulate can ultimately lead to degradation of device components and failure of the device.

Foam bonding tapes are ideal for a variety of applications where bonding and joining of components are needed, most prevalent in the electronic, automotive, and transportation industry. Bonding tapes reduce or eliminate the need for mechanical fasteners such as rivets or screws, liquid adhesives, or welds. This leads to shorten production periods, higher productivity, lower costs, and improved product appearance. Bonding tapes have a foam core based on polyurethane (PU), polyolefin, acrylic polymers, and others. Polyurethane foam cores show improved performance with respect to dissipating vibrations and distributing stress. However, conventional PU foam tapes may not meet all demands of the application. For instance, for large dimension parts such as car body side molding, there can be difference of thermal expansion and surface mismatch between the body side molding and the car body, which creates additional strain on the bonding tape. Over time, repetition of such additional strain can ultimately lead to degradation of the bonding between car body and the body side molding.

As such, improved sealing gaskets and bonding tapes would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENTS

In a first aspect, a polymer sheet includes a polyurethane foam substrate. The polyurethane core has a first major surface and a second major surface opposite the first major surface. The polymer sheet can have at least one functional layer overlying a major surface. The polymer sheet has a thickness $t_{PS}$. The polyurethane foam substrate has a thickness $t_{PC}$. In embodiments $t_{PC}$ can be at least 0.3 $t_{PS}$. In other embodiments, the polyurethane foam substrate includes a polyurethane polymer. The polyurethane foam substrate can have at least one of the following property:

(i) a Scratch Resistance Rating, as further described herein, of not greater than about 10 wt %,
(ii) an elongation at break of at least 200%,
(iii) a tensile strength at break of at least 0.3 MPa,
(iv) a loss of tensile strength of not greater than 30% when exposed to UV light according to standard SAE J1960 (Rev. August 2003).

In a second aspect, an assembly includes a first member and a second member and a gasket. The gasket can be compressed between the first member and the second member. The gasket can include a polyurethane core having a first major surface and a second major surface opposite the first major surface. In embodiments, the gasket can be compressed between the first and the second member at a compression of at least about 10%. The polyurethane core can include a polyurethane polymer. The polyurethane core can include one of the above described properties (i) through (iv), namely, a abrasion Resistance Rating of not greater than about 10 wt %, an elongation at break of at least 200%, a tensile strength at break of at least 0.5 MPa, or a loss of tensile strength of not greater than 30% when exposed to UV light according to standard SAE J1960 (Rev. August 2003).

In a third aspect, a method of preparing a polymer sheet includes frothing a polyurethane dispersion into a froth. The froth can be casted onto a liner. The casted froth can be treated to have a uniform thickness. The method can further include drying the casted froth to form a polyurethane core. The polyurethane core has a thickness $t_{PF}$. In embodiments $t_{PF}$ can be at least 0.3 of the total thickness of the polymer sheet, The polyurethane core can include one of the above described properties (i) through (iv), with respect to Scratch Resistance Rating, elongation at break, tensile strength at break, or loss of tensile strength when exposed to UV light according to standard SAE J1960 (Rev. August 2003).

Figure 1:
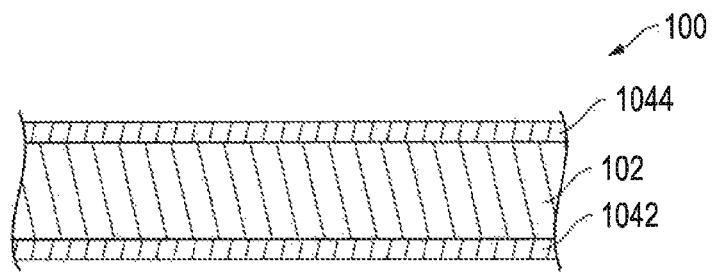
FIG. 1, FIG. 2, FIG. 3, FIG. 4, FIG. 5, and FIG. 6 include illustrations of exemplary foam materials useful in making sealing gaskets FIG. 7 includes an illustration of an exemplary seal gasket.

As illustrated in FIG. 1, a gasket 100 includes a polyurethane foam layer 102 having a top surface and a bottom surface. The foam layer 102 can be a polyurethane foam formed from a polyurethane dispersion, a surfactant, a thickener, a pigment, and an optional solvent, an optional chain extender or crosslinking agent.

As polyurethane dispersions within the meaning of the present invention, the following dispersion can be used, optionally in combination:

a) Anionic aliphatic polyester polyurethane dispersions (dispersions based on polyester and aliphatic isocyanates anionic polyurethane)

Among these, the following products sold by the Bayer Material Science AG can be used: Impranil® LP RSC 1380, DL 1537 XP, DL 1554 XP.

b) Anionic aliphatic polyether polyurethane dispersions

Among these, the following products sold by the Bayer Material Science AG can be used: Impranil® LP DSB 1069 c) Aliphatic polycarbonate ester polyether polyurethane dispersions

Among these, the following polyurethane dispersion sold by the Bayer Material Science AG can be used: Impranil® DLU Dispersion.

d) Anionic polycarbonate polyurethane dispersions

Among these, the following polyurethane dispersion sold by the Bayer Material Science AG can be used: Impranil® DL 2288 XP Dispersion These are high solids (about 50% to 60%) polyurethane dispersions. All products are free from organic cosolvents, thickening agents and external emulsifiers.

As surfactant, which also act as foam stabilizer, the following compounds can be used: Stokal® STA, Stokal® SR As thickener, Borchigel® ALA can be used. As pigment, SP-9695 from Shanghai Yuanhe Chemical can be used. As an optional solvent, generic isopropyl alcohol (IPA) can be used.

As an optional cross-linker or chain extender, Cymel® 325 or Imprafix® 2794 XP can be used. Yet, other cross-linkers can be used as well. For example, optional cross-linker can be melamine-based cross-linkers, an isocyanate-based cross-linker, or a polyaziridine based cross-linker. In one particular embodiment, the melamine-based cross-linker is melamine.

The foregoing stated examples for a polyurethane dispersion, a surfactant, a thickener, a pigment, and a solvent, are solely exemplary, wherein each represents a broader class of compounds that can be used. It is understood that amounts and ingredients can be modified or replaced with other commercially available ingredients to obtain the claimed polymer sheet.

For example, the above surfactant can be modified or replaced with another surfactant. The additional or replacing surfactant can be selected from ether sulfates, fatty alcohol sulfates, sarcosinates, organic amine oxides, sulfonates, betaines, organic acid amides, sulfosuccinates, sulfonic acids, alkanolamides, ethoxylated fatty alcohols, sorbinates, or any combination thereof.

Referring to FIG. 1, a release liner 1044 overlies the foam substrate 102 over a major surface. In one embodiment (not illustrated), only one release liner 1042 covers a first major surface of the foam core 102, while the second major surface remains uncovered. In another embodiment, as shown in FIG. 1, two release liners, 1042 and 1044, overlie the two major surfaces of the foam core 102.

The foam core and the at least one release liner form a polymer sheet. In embodiments the polymer sheet has a primary aspect ratio, defined as the ratio of the largest dimension of the polymer sheet, i.e., length, over the second largest dimension, i.e., width of the polymer sheet. The primary aspect ratio of the polymer sheet can be at least about 100, such as at least about 200, at least about 400, at least about 800, at least about 1000, or at least about 1500.

In embodiments, the foam substrate 102 can have a thickness of at least about 0.2 mm, such as at least about 0.4 mm, at least about 0.6 mm, at least about 0.8 mm, at least about 1.0 mm, at least about 1.2 mm, at least about 1.4 mm, at least about 1.6 mm, at least about 1.8 mm, at least about 2.0 mm, or at least about 2.2 mm. In yet other embodiments, the foam substrate can have a thickness of not greater than about 3.0 mm, such as not greater than about 2.8 mm, not greater than about 2.6 mm, not greater than about 2.4 mm, not greater than about 2.2 mm, not greater than about 2.0 mm, not greater than about 1.8 mm, or not greater than about 1.6 mm.

In embodiments, the polyurethane core 102 can have a density as measured according to ASTM D3574 of at least 50 kg/m$^3$, such as at least about 60 kg/m$^3$, at least about 70 kg/m$^3$, at least about 80 kg/m$^3$, at least about 90 kg/m$^3$, at least about 100 kg/m$^3$, at least about 120 kg/m$^3$, at least about 140 kg/m$^3$, at least about 160 kg/m$^3$, at least about 180 kg/m$^3$, at least about 200 kg/m$^3$, at least about 250 kg/m$^3$, at least about 300 kg/m$^3$, at least about 350 kg/m$^3$, at least about 400 kg/m$^3$, at least about 450 kg/m$^3$, at least about 500 kg/m$^3$, at least about 600 kg/m$^3$, or at least about 700 kg/m$^3$. In other embodiments, the polyurethane foam substrate can have a density of not greater than about 900 kg/m$^3$, such as not greater than about 800 kg/m$^3$, not greater than about 700 kg/m$^3$, not greater than about 600 kg/m$^3$, not greater than about 500 kg/m$^3$, not greater than about 450 kg/m$^3$, not greater than about 400 kg/m$^3$, not greater than about 350 kg/m$^3$, not greater than about 330 kg/m$^3$, not greater than about 310 kg/m$^3$, not greater than about 290 kg/m$^3$, not greater than about 270 kg/m$^3$, not greater than about 250 kg/m$^3$, not greater than about 230 kg/m$^3$, not greater than about 210 kg/m$^3$, not greater than about 190 kg/m$^3$, not greater than about 170 kg/m$^3$, not greater than about 150 kg/m$^3$, not greater than about 130 kg/m$^3$, or not greater than about 110 kg/m$^3$.

Moreover, in embodiments, the polyurethane foam substrate comprises cells. The cells can be closed, semi-open, or open. At least 50% of the cells can have a cell diameter of at least about 30 microns, such as at least about 40 microns, at least about 50 microns, at least about 60 microns, at least about 70 microns, at least about 80 microns, at least about 90 microns, at least about 100 microns, at least about 120 microns, and not greater than about 160 microns. In other embodiments, at least 50% of the cells can have a cell diameter of, not greater than about 160 microns, not greater than about 140 microns, not greater than about 120 microns, not greater than about 100 microns, not greater than about 90 microns, not greater than about 80 microns, not greater than about 70 microns, or not greater than about 60 microns.

Moreover, the polyurethane core can further include a flame retardant or a filler. The filler can be selected from bentonite, kaolin, powdered glass, glass beads, glass fibers, calcium carbonate, quartz sand, fluoropolymer, thermoplastic, microspheres, or any combination thereof.

To form the foam, a polyurethane dispersion in mixture with a surfactant, a pigment, an optional solvent, an optional cross-linker, and an optional filler can be frothed mechanically. In addition, a blowing agent, such as a blowing agent can be used. In an example, the mixture can be frothed in the presence of a gas, such as air, nitrogen, or a noble gas including, for example, helium, neon, or argon.

Blowing agents can be used, alone or as mixtures with each other. Blowing agents can be selected from a broad range of materials, including hydrocarbons, halohydrocarbons, ethers, esters and partially halogenated hydrocarbons, ethers and esters, or the like. Typical physical blowing agents have a boiling point between minus 50° C. and positive 100° C., and preferably between about −50° C. and 50° C. Exemplary physical blowing agents include the CFC's (chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the FC's (fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the fluoroethers such as methyl-1,1,1-trifluoroethylether and difluoromethyl-1,1,1-trifluoroethylether; hydrocarbons such as n-pentane, isopentane, and cyclopentane; methylene chloride; or any combination thereof. Such blowing agents can be used in an amount of 5% to 50% by weight of the reactive composition, typically 10% to 30% by weight of the reactive composition.

Returning to FIG. 1, the foam layer 102 has a top surface and a bottom surface that are characterized by a skin. The skin, for example, is substantially free of pores. For example, the skin associated with the top surface and the bottom surface can be substantially continuous including few, if any, breaks or openings.

In fact, the skin has a scratch resistance. Scratch resistance can be determined with a Taber® Abraser. Scratch resistance was quantified by determining a Scratch Resistance Rating. The Scratch Resistance Rating is the loss in weight percentage of the mass of a sample having a diameter of 100 mm after exposure to 500 cycles on a Taber 5135 Rotary Abraser using Calibrade H-18 wheels at a speed of 60 cycles per minute. Accordingly, the fraction of [Mass (before test)-Mass (after test)]/Mass (before test) in percent provides the Scratch Resistance Rating.

In embodiments, the Scratch Resistance Rating is not greater than 10 wt %, such as not greater than about 8 wt %, not greater than about 6 wt %, not greater than about 5 wt %, not greater than about 4 wt %, or not greater than about 2 wt %.

Further referring to FIG. 1, the release liner, 1042 or 1044, can include paper, a polymer film, or any combination thereof. An exemplary paper includes a coated paper. An exemplary polymer film is formed of polyolefin, polyester, polyamide, polyvinyl chloride, fluoropolymer, polyimide, or any combination thereof. An exemplary polyolefin includes polyethylene, polypropylene, or any combination thereof. An exemplary polyester includes poly(ethylene terephthalate) (PET). In another example, the polymer film is formed of an aromatic polyester or a polyesteramide. In one particular embodiment, the polymer film is formed of polyethylene terephthalate (PET). In another example, the polymer film is formed of low density polyethylene (LDPE), high density polyethylene (HDPE), polypropylene, or any combination thereof.

In an example, the release liner, 1042 or 1044 can have a thickness in a range of 0.01 mm to 0.1 mm. For example, the liner can have a thickness in a range of 25 microns to 180 microns, such as a range of 25 microns to 150 microns, or even a range of 25 microns to 100 microns. In embodiments, the release liner can have a thickness of at least about 0.01 mm, such as at least about 0.015 mm, at least about 0.02 mm, at least about 0.025 mm, at least about 0.03 mm, at least about 0.035 mm, or at least about 0.04 mm. In other embodiments, the release liner can have a thickness of not greater than about 0.1 mm, such as not greater than about 0.09 mm, not greater than about 0.08 mm, not greater than about 0.075 mm, not greater than about 0.07 mm, not greater than about 0.065 mm, not greater than about 0.06 mm, not greater than about 0.055 mm, or not greater than about 0.05 mm. Further, the release liner can have a base weight in a range of 10 g/m2 to 400 g/m2, such as a range of 30 g/m2 to 350 g/m2, or even a range of 40 g/m2 to 300 g/m2.

In a particular example, the surfaces of the foam layer in contact with the release liner exhibits a desirable range of adhesion to a release liner (PET film) as determined by the method described in the Examples. For example, the surface of the foam layer in contact with the release liner (PET) can exhibit an adhesion of approximately 0.01 N/in or lower. Alternatively, the surface can have an initial adhesion in a range of 0.01 N/in to 0.2 N/in, a range of 0.015 N/in to 0.2 N/in, or even a range of 0.02 N/in to 0.2 N/in.

Figure 2:
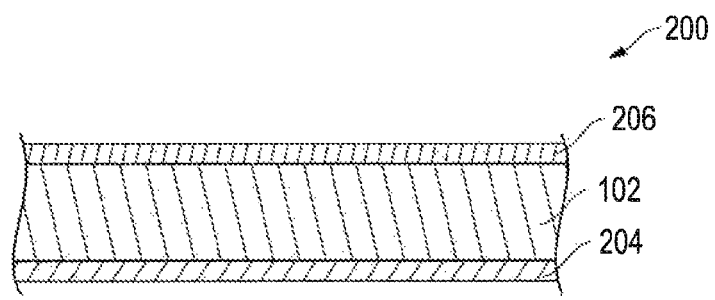

FIG. 2 illustrates another embodiment of the polymer sheet. As depicted, a topcoat 206 can overlie the first major surface of the foam core 102. The topcoat can include an acrylic coating, a polyurethane coating, or a combination thereof. In a particular embodiment, the topcoat includes a silicone modified polyurethane coating. In embodiments, the topcoat can have thickness of at least about 0.001 mm, such as at least about 0.002 mm, at least about 0.003 mm, or at least about 0.004 mm. In other embodiments, the topcoat can have thickness of not greater than about 0.01 mm, such as not greater than about 0.009 mm, not greater than about 0.008 mm, not greater than about 0.007 mm, not greater than about 0.006 mm, or not greater than about 0.005 mm.

Referring further to FIG. 2, a permanent liner 204 can be disposed over the second major surface. In embodiments, the permanent liner 204 can include a thermoplastic. For example, the thermoplastic is selected from polyethylene, polyester, polyimide, or any combination thereof. In a particular embodiment, the polyethylene includes ultra-high molecular weight polyethylene.

Similar to the release liner, the permanent liner can have a thickness of at least about 0.01 mm, such as at least about 0.015 mm, at least about 0.02 mm, at least about 0.025 mm, at least about 0.03 mm, at least about 0.035 mm, or at least about 0.04 mm. In other embodiments, the permanent liner can have a thickness of not greater than about 0.1 mm, such as not greater than about 0.09 mm, not greater than about 0.08 mm, not greater than about 0.075 mm, not greater than about 0.07 mm, not greater than about 0.065 mm, not greater than about 0.06 mm, not greater than about 0.055 mm, or not greater than about 0.05 mm.

Figure 3:
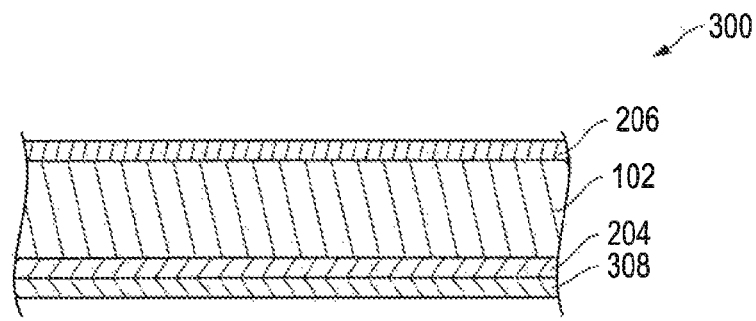

FIG. 3 depicts a further development from the polymer sheet 200 of FIG. 2. In FIG. 3, an adhesive layer 308 is disposed over the permanent liner 204. The adhesive layer can be a pressure sensitive adhesive, such as an acrylic adhesive, a silicon adhesive, a rubber hot melt adhesive, or a hybrid adhesive. Similar to the permanent liner, the adhesive layer 308 can have a thickness of at least about 0.01 mm, such as at least about 0.015 mm, at least about 0.02 mm, at least about 0.025 mm, at least about 0.03 mm, at least about 0.035 mm, or at least about 0.04 mm. In other embodiments, the adhesive layer can have a thickness of not greater than about 0.1 mm, such as not greater than about 0.09 mm, not greater than about 0.08 mm, not greater than about 0.075 mm, not greater than about 0.07 mm, not greater than about 0.065 mm, not greater than about 0.06 mm, not greater than about 0.055 mm, or not greater than about 0.05 mm.

In further examples, the polymer sheet can include sub-combinations of the elements shown in FIGS. 1-3. For example, two liners, one being a release liner and one being a permanent liner can be disposed over the first and second major surface, respectively. Alternatively, two permanent liners can overlie both major surfaces. Accordingly, for an assembly having two permanent liners, one or both liner can be overlaid with an adhesive.

Figure 4:
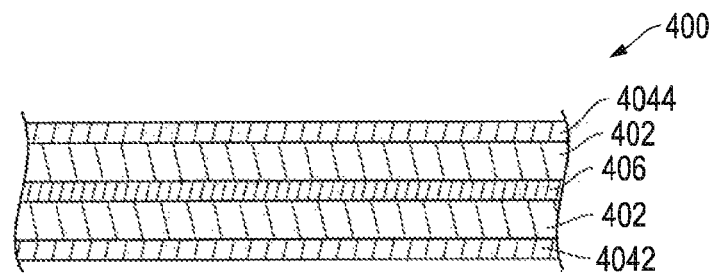
Figure 5:
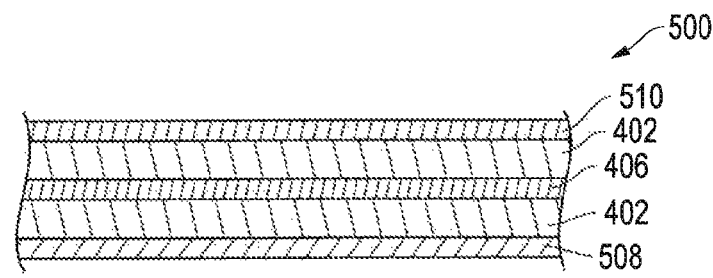
Figure 6:
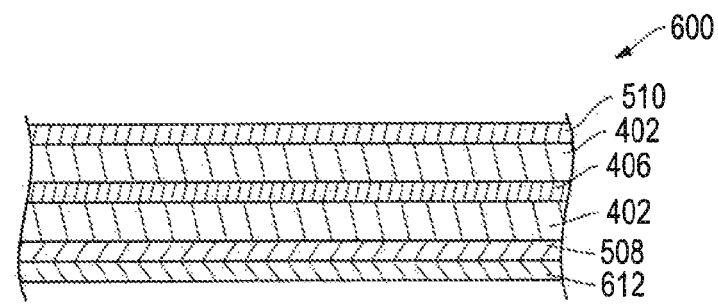

FIGS. 4-6 are analogous to FIGS. 1-3 with the difference that the foam core has a film 406 embedded. Accordingly, a film 406 has two major surfaces, on both of which a polyurethane foam core 402 is disposed. The stack of film 406 and polyurethane foam layers 402 (402/406/402) form now the core of the polymer sheet.

Analogous to FIG. 1, the core stack 402/406/402 in FIG. 4 can be overlaid with release liners 4042 and 4044. Likewise analogous to FIG. 2, the core stack 402/406/402 in FIG. 5 can be covered by a topcoat 510 (analogous to topcoat 206) and a permanent liner 508 (analogous to permanent liner 204). Additionally, as shown in FIG. 6, the polymer sheet 500 of can further include an adhesive layer (analogous to layer 308) to form polymer sheet 600.

The film 406 functions to stabilize the core during when torsion and shear forces are affecting the polymer sheet. The film 406 can include a thermoplastic. For example, the thermoplastic can be selected from polyethylene, polyester, polyimide, or any combination thereof. In one particular example, the polyethylene includes ultra-high molecular weight polyethylene. Similar to the permanent liner, the film 406 can have a thickness of at least about 0.01 mm, such as at least about 0.015 mm, at least about 0.02 mm, at least about 0.025 mm, at least about 0.03 mm, at least about 0.035 mm, or at least about 0.04 mm. In other embodiments, the adhesive layer can have a thickness of not greater than about 0.1 mm, such as not greater than about 0.09 mm, not greater than about 0.08 mm, not greater than about 0.075 mm, not greater than about 0.07 mm, not greater than about 0.065 mm, not greater than about 0.06 mm, not greater than about 0.055 mm, or not greater than about 0.05 mm. Moreover, the thickness of stack 402/406/402 can be identical to the thickness of the foam core 102 as described above.

In particular, the foam layer is formed of a polyurethane foam having a structural feature where the foam core forms the major component of the polymer sheet as shown in the cross-sectional thickness ratio, where tPC (thickness of the polyurethane core) is at least 0.5 tPS (thickness of polymer sheet), such as at least 0.55 tPS, at least 0.6 tPS, at least 0.65 tPS, at least 0.7 tPS, at least 0.75 tPS, at least 0.8 tPS, at least 0.82 tPS, at least 0.84 tPS, at least 0.86 tPS, at least 0.88 tPS, at least 0.9 tPS, or at least 0.92 tPS. In one embodiment, the polymer sheet is formed in to a roll. The roll can have a diameter of at least about 0.1 m, such as at least about 0.2 m, at least about 0.3 m, at least about 0.5 m, at least about 0.8 m, at least about 0.9 m, at least about 1.0 m, at least about 1.1 m, at least about 1.2 m, or at least about 1.3 m. In another embodiment, the roll has a diameter of not greater than about 2.0 m, such as not greater than about 1.9 m, not greater than about 1.8 m, not greater than about 1.7 m, not greater than about 1.6 m, or not greater than about 1.5 m.

Moreover, the foam layer is formed of a polyurethane foam having inherent properties such as Scratch Resistance Rating (as described herein), Elongation at Break, Tensile Strength at Break, and Loss of Tensile Strength after UV Exposure.

The elongation at break of the polyurethane foam can be at least about 200%, such as at least about 300%, at least about 400%, at least about 500%, at least about 600%, at least about 700%, at least about 800%, at least about 900%, at least about 1000%, at least about 1200%, at least about 1400%, at least about 1600%, or at least about 1800%.

The Tensile Strength at Break can be at least about 0.3 MPa, such as at least about 0.5 MPa, at least about 0.7 MPa, at least about 1 MPa, at least about 1.5 MPa, at least about 2 MPa, at least about 2.5 MPa, at least about 3 MPa, at least about 3.5 MPa, at least about 4 MPa, at least about 4.5 MPa, at least about 5 MPa, at least about 5.5 MPa, or at least about 6 MPa.

The Loss of Tensile Strength when exposed to UV light according to standard SAE J1960 (Rev. August 2003) is not greater than about 30%, such as not greater than about 25%, not greater than about 20%, not greater than about 15%, not greater than about 10%, or not greater than about 5%. In another example, the Loss of Tensile Strength can be at least about 5%, such as at least about 8%, or at least about 10%.

The difference or distance between two colors is a metric of interest in color science. It allows to quantify a notion that would otherwise be described with adjectives in the eye of a viewer. Such biased description is a detriment to anyone whose work is color critical. Common definitions make use of the Euclidean distance in a device independent color space. The International Commission on Illumination (CIE) calls their distance metric ΔE*ab (also called ΔE* or ΔE) used to denote difference of color sensation. Different studies have proposed different ΔE values that have a JND (just noticeable difference). For bonding tape products used in the electronic and automotive industry, the products begin to show a JND between ΔE's of 2.5 and 4.0. These non-uniformities are important because the human eye is more sensitive to certain colors than others. A good metric should take this into account in order for the notion of a "just noticeable difference" to have meaning. Otherwise, a certain ΔE that may be insignificant between two colors that the eye is insensitive to may be conspicuous in another part of the spectrum. The 1976 formula is the first color-difference formula that related a measured to a known Lab value. This formula has been succeeded by the 1994 and 2000 formula's because the Lab space turned out to be not as perceptually uniform as intended, especially in the saturated regions. This means that this formula rates these colors too highly as opposed to other colors. Using $(L^*_2, a^*_2, b^*_2)$ and $(L^*_1, a^*_1, b^*_1)$ of two colors in $L^*a^*b^*$, ΔE is:

$$\Delta E^* = \sqrt{(L^*_2 - L^*_1)^2 + (a^*_2 - a^*_1)^2 + (b^*_2 - b^*_1)^2}$$

For ΔE of 4.0 or less there is generally no noticeable difference between the colors, while for a ΔE of more than 4.0, a color difference becomes noticeable. Since bonding tapes or gaskets in the automotive or electronic industry can be visibly exposed, it is desirable to have little color change as the product is exposed to exterior factors, such as ageing, weathering, operation conditions (temperature, irradiation, etc.). Depending on the particular color of bonding tapes and gaskets, a color change or discoloration can be noticeable at lower ΔE, such as at not greater than 3.8, not greater than 3.6, not greater than 3.4, not greater than 3.2, not greater than 3.0, not greater than 2.8, not greater than 2.6, not greater than 2.4, not greater than 2.2, not greater than 2.0, not greater than 1.8, not greater than 1.6, or not greater than 1.4.

The discoloration when exposed to UV light according to standard SAE J1960 (Rev. August 2003) is expressed by measuring the CIE values of a sample before and after exposure. In an embodiment, ΔE can be not greater than 10.0, such as not greater than 9, not greater than 8, not greater than 7, not greater than 6, not greater than 5, not greater than 4, not greater than 3.8, not greater than 3.6, not greater than 3.4, not greater than 3.2, not greater than 3.0, not greater than 2.8, not greater than 2.6, not greater than 2.4, not greater than 2.2, not greater than 2.0, not greater than 1.8, not greater than 1.6, or not greater than 1.4. In another embodiment, ΔE can be not greater than 1.2, such as not greater than 1.1, not greater than 1.0, not greater than 0.9, not greater than 0.85, not greater than 0.8, not greater than 0.75, not greater than 0.7, or not greater than 0.65.

Yellowing of bonding tape is a common observation where tapes are exposed to irradiation such as regular daylight, e.g., bonding tapes between transparent sheet, such as the display of an electronic device or tapes at the rim or between window panes. In CIE terms, yellowing of materials shows a major shift of the b* value of the bonding tape as opposed to a change of the L* or a*. The shift of the b* value, Δb* or Δb, of two colors (L*$_2$, a*$_2$, b*$_2$) and (L*$_1$, a*$_1$, b*$_1$), is:

$$\Delta b^* = \sqrt{(b^*_2 - b^*_1)^2}$$

As for the discoloration, the yellowing, Δb, can be determined by exposing a sample to UV light according to standard SAE J1960 (Rev. August 2003) and measuring the CIE values of a sample before and after exposure. In an embodiment, Δb can be not greater than 5, such as not greater than 4, not greater than 3, not greater than 2, not greater than 1.5, not greater than 1.4, not greater than 1.3, not greater than 1.2, not greater than 1.1, not greater than 1.0, not greater than 0.9, not greater than 0.85, not greater than 0.8, not greater than 0.75, not greater than 0.7, not greater than 0.65, not greater than 0.6, not greater than 0.55, not greater than 0.5.

Further, the foam layer is formed of a polyurethane foam having material properties such as density, a recovery time, force-to-compress (FTC), compression force deflection (CFD), or compression set. Polyurethane foams, particularly those formed as described in the method below, exhibit properties that are particularly suited for use in sealing gaskets.

In an example, the foam layer has a density of not greater than about 900 kg/m³ as measured in accordance with ASTM D3574. For example, the density can be not greater than about 800 kg/m³, such as not greater than about 700 kg/m³, not greater than about 600 kg/m³, not greater than about 500 kg/m³, not greater than about 450 kg/m³, not greater than about 400 kg/m³, not greater than about 350 kg/m³, not greater than about 330 kg/m³, not greater than about 310 kg/m³, not greater than about 290 kg/m³, not greater than about 270 kg/m³, not greater than about 250 kg/m³, not greater than about 230 kg/m³, not greater than about 210 kg/m³, not greater than about 190 kg/m³, not greater than about 170 kg/m³, not greater than about 150 kg/m³, not greater than about 130 kg/m³, or not greater than about 110 kg/m³. In an example, the density of the foam layer is in a range of 50 kg/m³ to 250 kg/m³, such as a range of 60 kg/m³ to 250 kg/m³, a range of 100 kg/m³ to 250 kg/m³, a range of 100 kg/m³ to 200 kg/m³, or even a range of 125 kg/m³ to 200 kg/m³.

A unique property exhibited by the foam layer, particularly those formed as described below, is recovery time. The recovery time is the time it takes for a foam to exert 1.5 N force following release from compression according to the method defined in the Examples. For example, the foam can exhibit an 80% recovery time parameter in a range of 0.001 seconds to 5 seconds, such as a range of 0.001 seconds to 2 seconds, a range of 0.001 seconds to 1 second, a range of 0.005 seconds to 1 second, 0.005 seconds to 0.1 seconds, or even a range of 0.005 seconds to 0.05 seconds. Further, the foam layer can exhibit a desirable 50% recovery time parameter of not greater than 4 seconds, such as not greater than 3 seconds, not greater than 2 seconds, not greater than 1.5 not greater than 1 second, not greater than 0.1 seconds, not greater than 0.01 seconds, or even not greater than 0.001 seconds. In a further example, the film layer can exhibit a 20% recovery time parameter of not greater than 0.002 seconds, such as not greater than 0.0015, or not greater than 0.001 seconds.

In addition, the foam layer exhibits a desirable compression profile. For example, the foam layer can exhibit a desirable instant force-to-compress (FTC) at 25% compression as measured according to ASTM D3574 Test C can be at least about 7 kPa, such as at least about 9 kPa, at least about 11 kPa, at least about 13 kPa, at least about 15 kPa, at least about 17 kPa, at least about 19 kPa, at least about 21 kPa, at least about 23 kPa, at least about 25 kPa, at least about 27 kPa, at least about 29 kPa, at least about 31 kPa, at least about 33 kPa, at least about 35 kPa, at least about 37 kPa, at least about 39 kPa, at least about 41 kPa, at least about 43 kPa, or at least about 45 kPa. In other embodiments, the force-to-compress at 25% compression as measured according to ASTM D3574 Test C can be not greater than about 50 kPa, such as not greater than about 48 kPa, not greater than about 46 kPa, not greater than about 44 kPa, not greater than about 42 kPa, not greater than about 40 kPa, not greater than about 38 kPa, not greater than about 36 kPa, not greater than about 34 kPa, not greater than about 32 kPa, not greater than about 30 kPa, not greater than about 28 kPa, not greater than about 26 kPa, not greater than about 24 kPa, not greater than about 22 kPa, not greater than about 20 kPa, not greater than about 18 kPa, not greater than about 16 kPa, not greater than about 14 kPa, or not greater than about 12 kPa.

Further, the foam layer can exhibit a compression force deflection (CFD), as measured in accordance with ASTM D3574 Test C at 25% compression of at least about 5 kPa, such as at least about 7 kPa, at least about 9 kPa, at least about 11 kPa, at least about 13 kPa, at least about 15 kPa, at least about 17 kPa, at least about 19 kPa, at least about 21 kPa, at least about 23 kPa, at least about 25 kPa, at least about 27 kPa, or at least about 29 kPa. In other embodiments, the foam layer can exhibit a compression force deflection (CFD), as measured in accordance with ASTM D3574 Test C at 25% compression of not greater than about 35 kPa, such as not greater than about 34 kPa, not greater than about 32 kPa, not greater than about 30 kPa, not greater than about 28 kPa, not greater than about 26 kPa, not greater than about 24 kPa, not greater than about 22 kPa, not greater than about 20 kPa, not greater than about 18 kPa, not greater than about 16 kPa, not greater than about 14 kPa, not greater than about 12 kPa, or not greater than about 10 kPa.

The foam layer can also exhibit a desirable compression set measured in accordance with ASTM D3574 at 70° C. for 22 hours and 50% compression of not greater than 15%, such as not greater than 12%, or even not greater than 10%. The foam layer can exhibit a compression set measured in accordance with ASTM D3574 at 23° C. for 22 hours at 50% compression of not greater than 10%, such as is not greater than about 8%, such as not greater than about 7%, not greater than about 6%, not greater than about 5%, not greater than about 4%, not greater than about 3%, or not greater than about 2%.

In a particular example, the polymer sheet is formed by applying a froth onto a moving carrier for a drying or curing oven. The resulting film is rolled for later storage and can be dispensed and cut into a desirable shape to form a sealing gasket or bonding tape. The froth can be formed from polyurethane dispersions. The polyurethane dispersions can be frothed to include a gas, such as air, nitrogen, or a noble gas including, for example, helium, neon, or argon.

In embodiments, the froth can have froth density of at least about 100 g/L, such as at least about 110 g/L, at least about 120 g/L, at least about 130 g/L, at least about 140 g/L, at least about 150 g/L, at least about 170 g/L, at least about 190 g/L, at least about 210 g/L, at least about 230 g/L, or at least about 250 g/L. In yet other embodiments, the froth density is not greater than about 1200 g/L, such as not greater than about 1100 g/L, not greater than about 1000 g/L, not greater than about 900 g/L, not greater than about 800 g/L, not greater than about 700 g/L, not greater than about 600 g/L, not greater than about 500 g/L, not greater than about 400 g/L, or not greater than about 300 g/L.

Frothing and also ingredients provide for a certain froth viscosity. In embodiments, the froth can have a viscosity of not greater than about 18000 cps, such as not greater than about 17000 cps, not greater than about 16000 cps, not greater than about 15000 cps, not greater than about 14000 cps, not greater than about 13000 cps, not greater than about 12000 cps, not greater than about 11000 cps, not greater than about 10000 cps, not greater than about 9000 cps, not greater than about 8000 cps, not greater than about 7000 cps, not greater than about 6000 cps, or not greater than about 5000 cps. In other embodiments, the froth can have a viscosity of at least about 800 cps, such as at least about 900 cps, at least about 1000 cps, at least about 1500 cps, at least about 2000 cps, at least about 2500 cps, at least about 3000 cps, at least about 3500 cps, or at least about 4000 cps.

The froth is applied as a foam layer to a carrier, which, for example, moves the foam layer through an oven. The carrier can be a release liner, a permanent liner, or a removable carrier having a non-stick surface. For example, the carrier can be coated with a release agent, such as a silicone release coating, or can include a non-stick material, such as a fluoropolymer, e.g., Teflon®.

Optionally, prior to entering the oven, a film can be applied over the foam layer. The film can constrain the growth of the foam layer to limit the thickness of the foam layer. For example, the film can have a tension applied between rollers, the tension limiting the expansion of the foam layer. Alternatively, the film can be free of tension and can allow the foam layer to expand to its full extent.

Alternatively, a blade or knife can spread the mixture to form a uniform thickness in the foam layer before it enters the oven. Alternatively, front rollers associated with the film can act to control the thickness of the mixture entering the oven.

After deposition on the carrier and after the optional film is placed over the foam layer, the foam layer enters an oven to further facilitate foaming and cross-linking. The oven can have a temperature in a range of 50° C. to 180° C., such as a range of 50° C. to 120° C., a range of 70° C. to 115° C., or even a range of 100° C. to 115° C. In embodiments, the temperature can be at least about 50° C., such as at least about 60° C., at least about 70° C., at least about 80° C., at least about 90° C., at least about 100° C., at least about 110° C., at least about 120° C., or at least about 130° C. In other embodiments, the temperature is not greater than about 180° C., such as not greater than about 170° C., not greater than about 160° C., or not greater than about 150° C.

After drying or at least partially curing within the oven the optional film can be removed and the carrier can be separated from the foam layer. The foam layer can be rolled into a roll. Alternatively, one or more of the film or carrier can remain attached to the foam to form a liner such as a release liner.

As another option, a liner can be applied over the carrier. The froth can be applied over the liner. A film can be applied over the froth as it enters the oven. After drying or at least partially curing, the liner is separated from the carrier and rolled with the polyurethane foam into a roll. Optionally, a release coating agent, such as a silicone release coating agent, can be applied between the carrier and the liner or between the liner and the froth. Similarly, the film is separated from the polyurethane foam layer. The resulting construction includes a foam layer and liner. The liner can be a permanent liner or a release liner.

In an alternative embodiment, the froth is dispensed onto a carrier. A film is applied over the froth as it enters the oven. After drying or at least partially curing, the film forms a liner and is rolled with the polyurethane foam into roll. Optionally, an additional liner can be applied over the carrier. The liner can be incorporated into the film product and rolled into roll. As such, liners can be applied to the foam layer as a release film from the support layer, as the film itself, as a liner released from the film, as the carrier itself, or any combination thereof.

Figure 7:
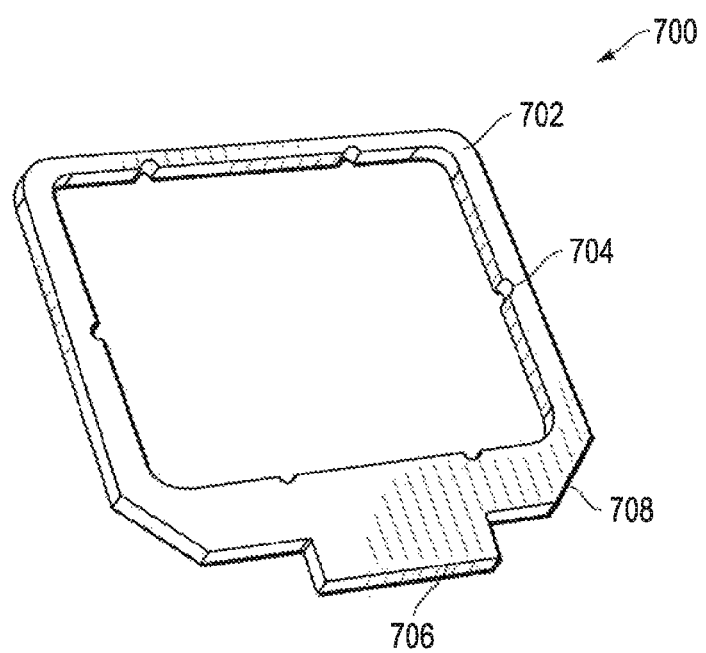

In a particular example, the resulting film and optional liner configurations can be dispenses from a roll and cut into shapes to form sealing gaskets. For example, FIG. 7 includes an illustration of an exemplary sealing gasket 700 cut from a polymer sheet. The sheet, including a film layer 702, can be cut into desirable shapes including inner contours 704 or outer contours 706. For example, the shape of the sealing gasket can be stamped, die cut, or laser cut from the dispensed film layers.

A difference between polymer sheets made from polyurethane dispersions (PUD) and polymer sheets made from polyurethane precursors such as polyols and isocyanates in the final product is the amount of aromatic residues and aromatic polymer groups in the polymeric scaffold. In general, foams made from polyols and isocyanates have a higher content of aromatic residues. Accordingly, as an inherent property of foams comprising aromatic groups, these foams are more susceptible to UV exposure than foams which have a lesser aromatic content or a higher aliphatic content. As a result, mechanical properties such as tensile strength of foams having an aromatic content decrease upon exposure to UV light. Conversely, foams from PUD, which have lesser amounts of aromatic residues or aromatic groups in the polymer, would show a reduced loss of mechanical properties, e.g., tensile strength, after extended exposure to UV radiation. Therefore, one option to differentiate between foams made from precursors, polyols and isocyanates, and foams made from PUD is by exposing samples to UV radiation and measuring loss of a mechanical property, such as elongation at break or tensile strength at break. Such measurements can be made according to SAE J1960 (Rev. August 2003). The sample that shows the greater loss is likely the sample that was made from PUD.

Another option to differentiate between a PUD made foam and traditionally made foam is by determining the amount of polymer catalyst in the resulting foam product. Since PUD are already polymerized polyurethane mixtures, no or little amounts of catalysts are necessary to complete the reaction to the final product. Accordingly, PUD foams have a lower content of catalysts. A number of the catalysts conventionally used to catalyze the reaction of the isocyanate component with the active hydrogen-containing component can be employed in the foam preparation. Such catalysts include organic and inorganic acid salts of, and organometallic derivatives of bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, trieyhylamine, triethylenediamine, N,N,N',N'-tetramethylenediamine, 1,1,3,3-tetramethylguanidine, N,N,N',N'-tetramethyl-1,3-butanediamine, N,N-dimethylethanolamine, N,N-diethylethanolamine, 1,3,5-tris (N,N-dimethylaminopropyl)-s-hexahydrotriazine, o- and p-(dimethylaminomethyl)phenols, 2,4,6-tris(dimethylaminomethyl)phenol, N,N-dimethylcyclohexylamine, pentamethyldiethylenetriamine, 1,4-diazobicyclo[2.2.2]octane, N-hydroxyl-alkyl quaternary ammonium carboxylates and tetramethylammonium formate, tetramethylammonium acetate, tetramethylammonium 2-ethylhexanoate and the like, as well as compositions comprising any one of the foregoing catalysts. Accordingly, the polyurethane core of the present embodiments include a catalyst in an amount less than for conventional polyurethanes, namely of not greater than about 0.3 wt %, such as not greater than 0.2 wt %, not greater than 0.1 wt %, not greater than 0.05 wt %, not greater than 0.01 wt %, not greater than 0.005 wt %, not greater than 0.001 wt %, not greater than 0.0005 wt %, or not greater than 0.0001 wt %. In embodiments, the polyurethane catalyst can be selected from the group consisting of triethylamine, tributylamine, N-methylmorpholine, N-ethylmorpholine, N,N,N',N'-tetramethylethylenediamine, pentamethyl-diethylenetriamine, 1,4-diazabicyclo(2.2.2)octane, N-methyl-N'-dimethylaminoethylpiperazine, bis-(dimethylaminoalkyl) piperazines, N,N-dimethylbenzylamine, N,N-dimethylcyclohexylamine, N,N-diethylbenzylamine, bis-(N,N-diethylaminoethyl)adipate, N,N,N',N'-tetramethyl-1,3-butanediamine, N,N-dimethyl-β-phenylethylamine, 1,2-dimethylimidazole, 2-methylimidazole, 2,2-bis-(dimethylaminoethyl)ether, di-n-octyltin mercaptide, tin(II) acetate, tin(II) octoate, tin(II) ethylhexoate, tin(II) laurate, dibutyltin(IV) oxide, dibutyltin(IV) dichloride, dibutyltin (IV) diacetate, dibutyltin(IV) dilaurate, dibutyltin(IV) maleate, and dioctyltin(IV) diacetate.

Figure 8A:
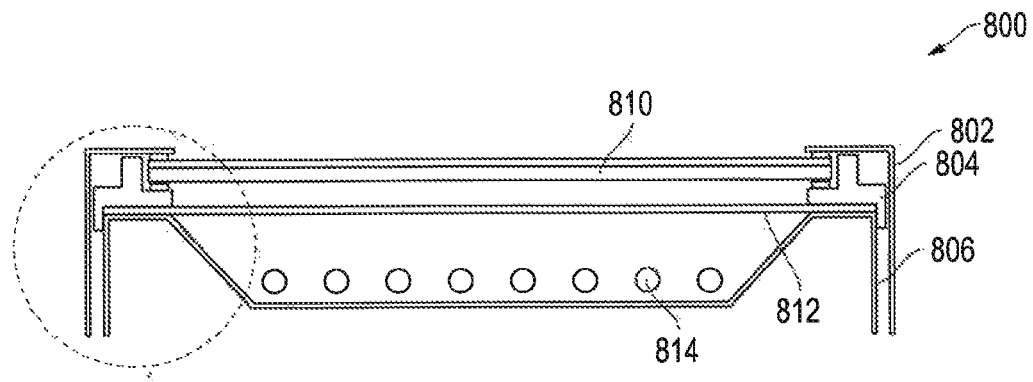
FIG. 8A and FIG. 8B include illustrations of an exemplary seal gasket configuration in an electronic device.

FIG. 8A depicts the cross-sectional view and components of an electronic device 800, such as tablet computer, having an upper bezel 802, an intermediate frame 804, and LCD display 810, a backlight frame 806 including backlight tubes 814 and diffuser film 812.

Figure 8B:
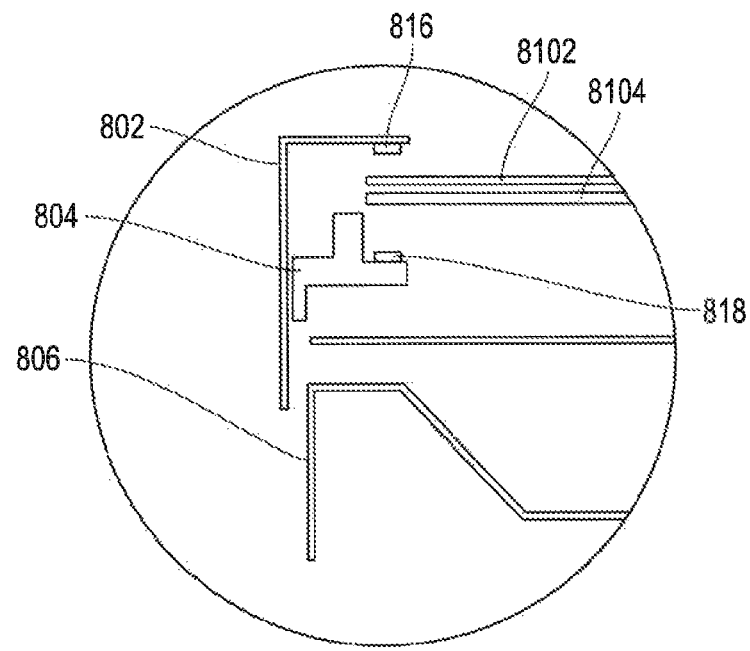

FIG. 8B depicts an enlarged view of a section of the disassembled device to further disclose the location for outer gasket 816 located between the cover sheet 8102 of the LCD screen 8104 and upper bezel 802. Inner gasket 818 is located between intermediate frame 804 and LCD screen 8104. The position of the two gaskets display the diversity polyurethane gaskets are exposed to. Gasket 816 has sealing function to separate external factors (dust and moisture) from the internal components, while inner gasket 818 has a spacing and a cushioning function, both of which need to be constant as the device heats and cools during periods of use. This example demonstrates the broad spectrum of demand that gaskets (and bonding tapes) have to satisfy.

In embodiments, the gaskets are compressed between first and second members of an electronic device, such as a circuit, a display part, an electronic screen, an electronic screen cover, a frame, a housing part, or any combination thereof. At least one of the components can be an electronic screen, the electronic screen including diodes, such as LEDs or LCDs. The gaskets can be compressed to at least 10%, such as at least about 20%, at least about 25%, at least about 30%, at least about 35%, at least about 40%, at least about 45%, at least about 50%, at least about 55%, at least about 60%, at least about 65%, at least about 70%, or at least about 75%. In other embodiments, the compression is not greater than about 90%, such as not greater than about 85%, not greater than about 80%, not greater than about 75%, not greater than about 70%, not greater than about 65%, not greater than about 60%, not greater than about 55%, not greater than about 50%, not greater than about 45%, or not greater than about 45%.

Figure 9:
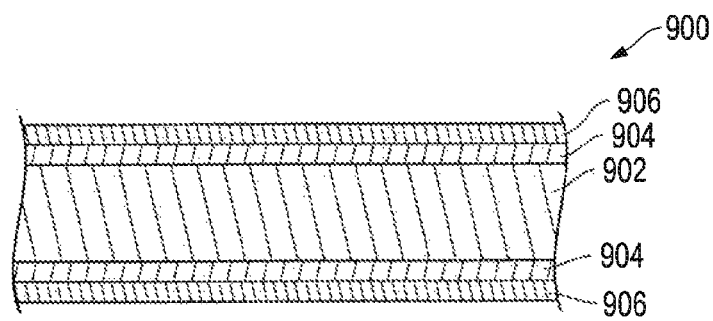
FIG. 9 includes an illustration of an exemplary foam material useful in making bonding tapes.

FIG. 9 depicts a cross-sectional view of a bonding tape 900 having a foam core 902, which can be identical to foam core 102 of FIGS. 1-3 or foam core stack 402/406/402 of FIGS. 4-6. The foam core is covered on both major surfaces with an adhesive layer 904, which is in structure and quality identical to adhesive layer 308 (FIG. 3) and 612 (FIG. 6). The adhesive layer 904 can be covered with one or two release liners 906 to ensure that the adhesive properties remain intact until deployment.

Figure 10:
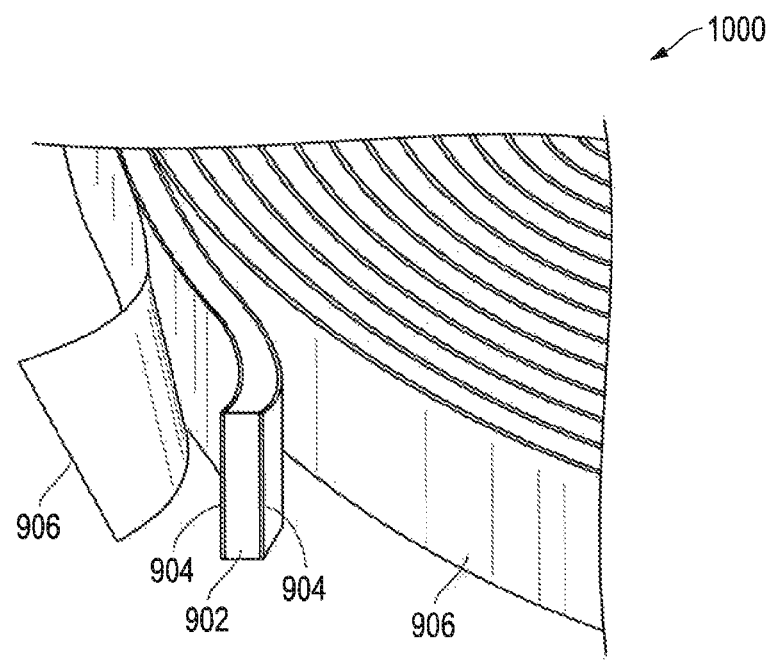
FIG. 10 includes an illustration of an exemplary bonding tape as manufactured for commerce.

FIG. 10 depicts another example of the bonding tape 900 in a rolled configuration. Here, the tape has only one release liner 906. The single release liner 906 serves as a protection layer for both adhesive layers 904 since the bonding tape is formed into a roll 1000.

EXAMPLES

Compression Force Deflection and Force-to-Compress

Figure 11:
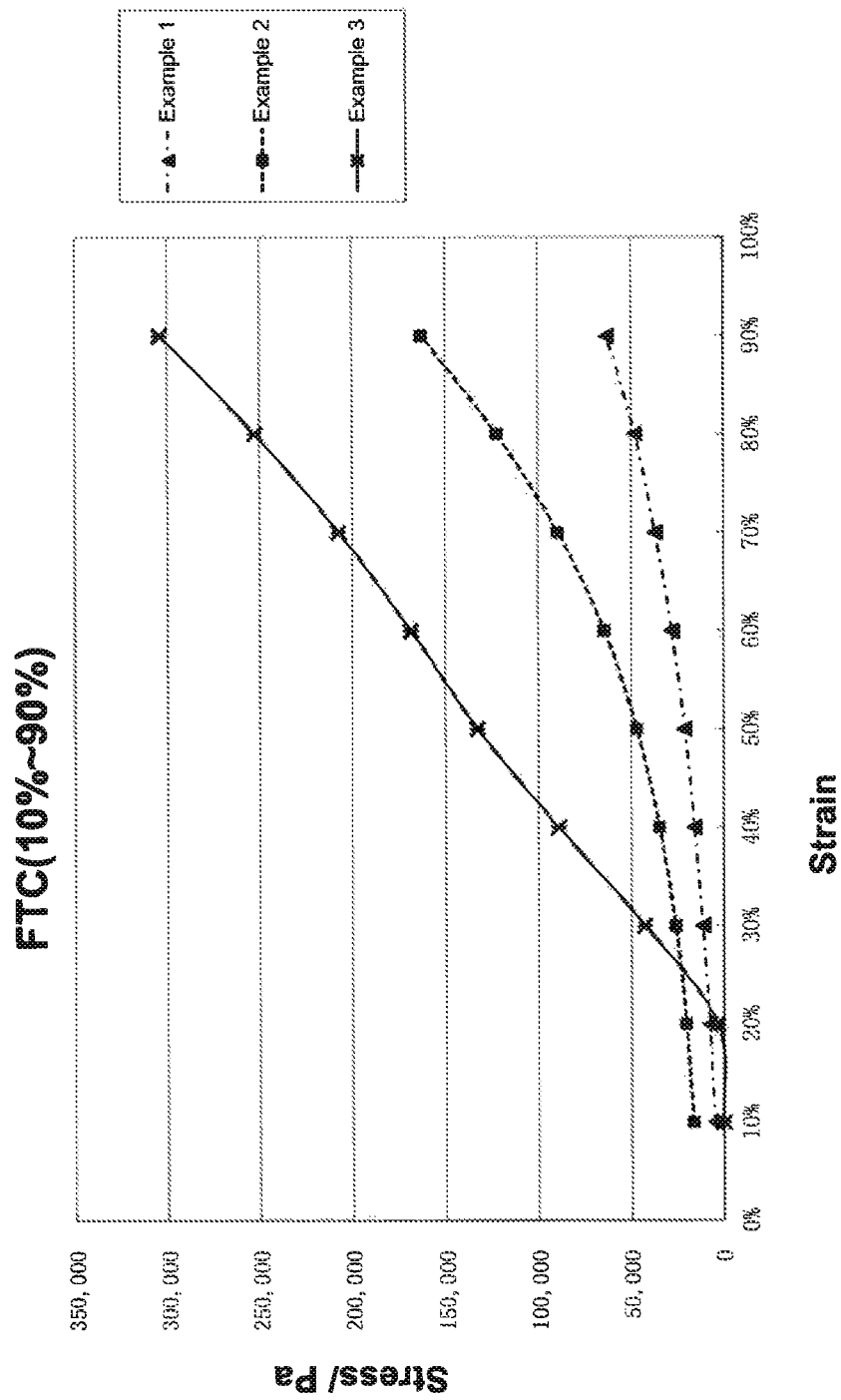
FIG. 11 and FIG. 12 include Compression Force Deflection and Force-to-Compress data as measured from samples according to embodiments.
Figure 12:
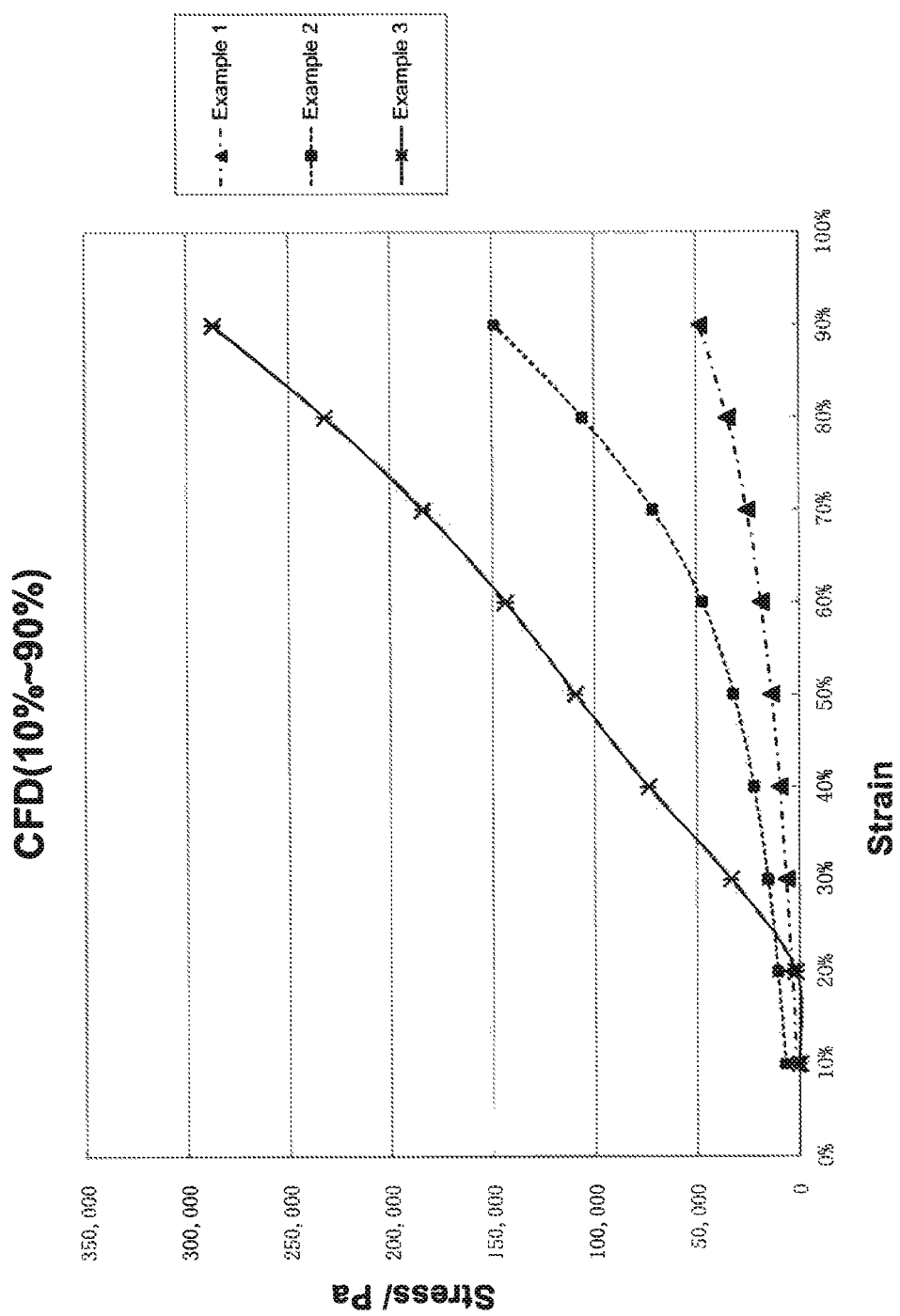

Compression force deflection (CFD) and Force-To-Compress (FTC) were measured in accordance with ASTM D3574 Test C at compression of 10%, 20%, 30%, . . . , 90%. Results are depicted in FIGS. 11 and 12. Samples of Examples 1-3 were prepared using the ingredients and amounts as shown in Table 1. The various froth samples were mechanically agitated to a froth density of 271 g/L and spread at Wet Gap of 1.25 mm. Table 1 shows that the samples differ in Froth densities. The samples were dried in an oven at temperatures in a range of 60° C. to 160° C.

TABLE 1

| Raw material | Example 1 weight/g | Example 2 weight/g | Example 3 weight/g |
|---|---|---|---|
| Impranil 1554 | 150 | 150 | 150 |
| Impranil 1537 | 150 | 150 | 150 |
| Stokal STA | 9 | 9 | 9 |
| Stokal SR | 9 | 9 | 9 |
| Borchigel ALA | 4 | 4 | 4 |
| ST-9695 | 12 | 12 | 12 |
| Froth Density/(g/L) | 260 | 353 | 735 |
| Froth Viscosity(cps) | 12000 | 11480 | 5820 |
| Wet Gap/mm | 1.25 | 1.25 | 1.25 |
| Appearance | Good | Good | Good |
| Rebound Time/s | <0.5 s | <0.5 s | <0.5 s |
| Density/(g/cm3) | 0.154 | 0.209 | 0.462 |
| Thickness/mm | 1.1 | 0.71 | 0.74 |

Recovery Time

The recovery time is the time a foam takes to exert a force of 1.5 N after release from 10 seconds of compression. The recovery time is determined in accordance with the method defined below and is expressed in terms of the percent compression prior to release. For example, the 20% recovery time is the time a foam takes to exert the desired force following 20% compression.

The method for determining the recovery time is a) compress a foam layer to a set percent compression (e.g., 20%, 50% or 80%) based on the foam's original thickness at a rate of 0.16 mm/sec using a flat probe having a surface area of 491 $mm^2$, b) hold compression for 10 seconds, c) move the probe to a position corresponding to 85% of the original thickness, d) measure the force exerted by the foam for approximately 30 seconds, and e) release compression. The recovery time is the amount of time the foam takes to exert 1.5 N on the probe when positioned at 85% of the original thickness.

Samples of Examples 4-8 were prepared using the ingredients and amounts as shown in Table 2. The various froth samples were prepared as described above for the compression examples. Afterwards samples of Examples 4-8 were subjected to the 50% recovery time test and the results are shown in Table 2.

TABLE 2

| Raw material | Example 4 weight/g | Example 5 weight/g | Example 6 weight/g | Example 7 weight/g | Example 8 weight/g |
|---|---|---|---|---|---|
| Impranil 1554 | 200 | | | | |
| Impranil 1537 | | | 200 | | |
| Impranil 1380 | | | | 200 | |
| Impranil 1069 | | | | | 200 |
| Impranil DLU | | 200 | | | |
| Stokal STA | 6 | 6 | 6 | 6 | 6 |
| Stokal SR | 6 | 6 | 6 | 6 | 6 |
| Borchigel ALA | 3 | 3 | 3 | 3 | 3 |
| ST-9695 | 12 | 12 | 12 | 12 | 12 |
| IPA | 1 | 1 | 1 | 1 | 1 |
| Cymel 325 | 3 | 3 | 3 | 3 | 3 |
| Froth Density/(g/L) | 271 | 271 | 271 | 271 | 271 |
| Froth Viscosity/(cps) | | 9520 | 11700 | 6340 | |
| Wet Gap/mm | 1.25 | 1.25 | 1.25 | 1.25 | 1.25 |
| Recvovery Time/s | 0.5 s | 5 s | 30 s | 2 s | 1 s |
| Density/(g/cm3) | 0.15 | 0.15 | 0.163 | 0.188 | 0.151 |
| Thickness/mm | 0.95 | 1.04 | 0.98 | 0.88 | 0.9 |

Compression Set

The compression set were measured in accordance with ASTM D3574 at 23° C. for 22 hours at 50%. Examples 9-22 were prepared as depicted in Tables 3A-3C and described above for the compression examples. Table 3A shows the results for formulations with variation of the polyurethane dispersions; Table 3B shows the results with variation in the amounts of crosslinker Cymel® 325; and Table 3C shows the results with variation in the amounts of surfactant Stokal®SR.

TABLE 3A

| Raw material | Example 9 weight/g | Example 10 weight/g | Example 11 weight/g | Example 12 weight/g | Example 13 weight/g |
|---|---|---|---|---|---|
| Impranil 1554 | 200 | | | | |
| Impranil 1537 | | | 200 | | |
| Impranil 1380 | | | | 200 | |
| Impranil 1069 | | | | | 200 |
| Impranil DLU | | 200 | | | |
| Stokal STA | 6 | 6 | 6 | 6 | 6 |
| Stokal SR | 6 | 6 | 6 | 6 | 6 |
| Borchigel ALA | 3 | 3 | 3 | 3 | 3 |

TABLE 3A-continued

| Raw material | Example 9 weight/g | Example 10 weight/g | Example 11 weight/g | Example 12 weight/g | Example 13 weight/g |
|---|---|---|---|---|---|
| ST-9695 | 12 | 12 | 12 | 12 | 12 |
| IPA | 1 | 1 | 1 | 1 | 1 |
| Cymel 325 | 3 | 3 | 3 | 3 | 3 |
| Froth Density/(g/L) | 271 | 271 | 271 | 271 | 271 |
| Froth Viscosity(cps) | | 9520 | 11700 | 6340 | |
| Wet Gap/mm | 1.25 | 1.25 | 1.25 | 1.25 | 1.25 |
| Density/(g/cm3) | 0.15 | 0.15 | 0.163 | 0.188 | 0.151 |
| Thickness/mm | 0.95 | 1.04 | 0.98 | 0.88 | 0.9 |
| C-set @ R.T. | 9.80% | 24.70% | 42.70% | 39.20% | 39.00% |

TABLE 3B

| Raw material | Example 14 weight/g | Example 15 weight/g | Example 16 weight/g | Example 17 weight/g | Example 18 weight/g |
|---|---|---|---|---|---|
| Impranil 1554 | 200 | 200 | 200 | 200 | 200 |
| Stokal STA | 6 | 6 | 6 | 6 | 6 |
| Stokal SR | 6 | 6 | 6 | 6 | 6 |
| Borchigel ALA | 3 | 3 | 3 | 3 | 3 |
| ST-9695 | 12 | 12 | 12 | 12 | 12 |
| IPA | 1 | 1 | 1 | 1 | 1 |
| Cymel 325 | 3 | 6 | 9 | 10 | 20 |
| Froth Density/(g/L) | 271 | 271 | 271 | 271 | 271 |
| Froth Viscosity(cps) | | 9520 | 11700 | 6340 | |
| Wet Gap/mm | 1.25 | 1.25 | 1.25 | 1.25 | 1.25 |
| Density/(g/cm3) | 0.15 | 0.15 | 0.163 | 0.188 | 0.151 |
| Thickness/mm | 0.95 | 1.04 | 0.98 | 0.88 | 0.9 |
| C-set @ R.T. | 9.80% | 17.00% | 0.72% | 0.63% | 7.00% |

TABLE 3C

| Raw material | Example 19 weight/g | Example 20 weight/g | Example 21 weight/g | Example 22 weight/g |
|---|---|---|---|---|
| Impranil 1554 | 200 | 200 | 200 | 200 |
| Stokal STA | 6 | 6 | 6 | 6 |
| Stokal SR | 6 | 10 | 14 | 20 |
| Borchigel ALA | 3 | 3 | 3 | 3 |
| ST-9695 | 12 | 12 | 12 | 12 |
| IPA | 1 | 1 | 1 | 1 |
| Cymel 325 | 3 | 3 | 3 | 3 |
| Froth Density/(g/L) | 271 | 271 | 271 | 271 |
| Froth Viscosity(cps) | | 9520 | 11700 | 6340 |
| Wet Gap/mm | 1.25 | 1.25 | 1.25 | 1.25 |
| Density/(g/cm3) | 0.15 | 0.15 | 0.163 | 0.188 |
| Thickness/mm | 0.95 | 1.04 | 0.98 | 0.88 |
| C-set @ R.T. | 9.80% | 5.00% | 2.88% | 2.88% |

Scratch Resistance Test

Scratch resistance was determined with a Taber® Abraser. Scratch resistance was quantified by determining a Scratch Resistance Rating. The Scratch Resistance Rating is the loss in weight percentage of the mass of a sample having a diameter of 100 mm after exposure to 500 cycles on a Taber 5135 Rotary Abraser using Calibrade H-18 wheels at a speed of 60 cycles per minute. Accordingly, the fraction of:

[Mass(before test)−Mass(after test)]/Mass(before test)

in percent provides the Scratch Resistance Rating.

Samples according to Example 2 above were prepared, discs having a diameter of 100 mm were cut out, weighted, and tested on the Taber 5135 Rotary Abraser equipped with Calibrade H-18 wheels at a speed of 60 cylces/minute. Samples were reweighted after 300, 500, and 700 cycles and the percentage of weight loss determined. The weight loss in weight percentage after 500 cycles provide the Scratch Resistance Rating.

Comparison Samples were also prepared commercially available gasketing foam from Saint-Gobain Performance Plastics Inc. Comparison Example A is a disc of K10 having a thickness of 1.0 mm. Comparison Example B is a disc made from a commercially available foam obtained from Rogers Foam Corp. Table 4 depicts the measured weight losses.

TABLE 4

| | Weight Loss/wt % | | |
|---|---|---|---|
| Number of Cycles | Example 2 | Comparison Example A | Comparison Example B |
| 300 | 1.82 | 4.62 | 25.4 |
| 500 | 2.28 | 10.22 | Sample broke |
| 700 | 4.61 | 22.83 | Sample broke |

Accelerated Exposure to UV-Light Tests

Two conventional samples, Comparison Samples C and D were prepared using a conventional polyurethane formed from polyether polyol and methylene diphenyl diisocyanate (MDI). The samples were tested against one sample which was prepared according to Example 23 (Table 5)

TABLE 5

| Raw material | Example 23 weight/g |
|---|---|
| Impranil 1380 | 200 |
| Stokal STA | 6 |
| Stokal SR | 6 |
| Borchigel ALA | 3 |
| IPA | 1 |
| Cymel 325 | 3 |

Tensile properties were measured according to ASTM standard D412-C with 5K N load cell at a rate of 12 inch/min. CIE Lab values were determined using a Hunter Lab model UltraScan PRO spectrophotometer. Samples were exposed to UV light according to standard SAE J1960 (Revised August, 2003). Tables 6 and 7 depict the results of the testing.

TABLE 6

| | Thickness (mm) | Density (g/cm$^3$) | Maximum Tensile Stress (N/mm$^2$) at t = 0 hr | Maximum Tensile Stress (N/mm$^2$) at t = 162 hr | Tensile Stress (%) at t = 0 hr | Tensile Stress (%) at t = 162 hr | Loss of Tensile stress (%) |
|---|---|---|---|---|---|---|---|
| Comparison Sample C | 0.60 | 0.65 | 1.57 | 0.37 | 462.12 | 151.72 | 67.2 |
| Comparison Sample D | 0.60 | 0.69 | 1.90 | 0.39 | 304.76 | 82.3 | 73.0 |
| Example 23 | 0.44 | 0.48 | 3.71 | 1.94 | 511.56 | 455.76 | 10.9 |

TABLE 7

| | CIE at t = 0 hr | | | CIE at t = 162 hr | | | Discoloration | Yellowing |
|---|---|---|---|---|---|---|---|---|
| | L | a | b | L | a | b | ΔE | Δb |
| Comparison Sample C | 92.87 | −5.45 | 16.82 | 81.47 | 2.19 | 43.43 | 29.9 | 26.6 |
| Comparison Sample D | 92.8 | −4.91 | 15.34 | 83.39 | 1.03 | 41.76 | 28.7 | 26.4 |
| Example 23 | 94.67 | 94.36 | −0.88 | −0.58 | 1.72 | 1.21 | 0.65 | 0.49 |

As can be noted from the above shown test results, samples using a PUD as a precursor show unexpectedly higher retention of tensile strength after 162 hrs of UV radiation. Moreover, while Comparison Samples C and D show a large discoloration after accelerated UV exposure, samples having a foam core from PUD dispersion have only a minimal color change that is not noticeable to the human eye.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

Item 1. A polymer sheet comprising:
a polyurethane core, having a first major surface and a second major surface opposite the first major surface; and
at least one functional layer, wherein the polymer sheet has a thickness $t_{PS}$ and the polyurethane core has a thickness $t_{PC}$, wherein $t_{PC}$ is at least 0.3 $t_{PS}$,
wherein the polyurethane core comprises polyurethane polymer, wherein the polyurethane core has at least one of the following property:
(i) a Scratch Resistance Rating of not greater than about 10 wt %,
(ii) an elongation at break of at least 200%,
(iii) a tensile strength at break of at least 0.3 MPa,
(iv) a loss of tensile strength of not greater than 30% when exposed to UV light according to standard SAE J1960 (Rev. August 2003).

Item 2. The polymer sheet according to item 1, wherein the polymer sheet has a primary aspect ratio of at least about 100, such as at least about 200, at least about 400, at least about 800, at least about 1000, or at least about 1500.

Item 3. The polymer sheet according to item 1, wherein the functional layer is selected from the group of a permanent liner, a release liner, a topcoat, an adhesive, or any combination thereof.

Item 4. The polymer sheet according to item 3, wherein the permanent liner includes a thermoplastic.

Item 5. The polymer sheet according to item 4, wherein the thermoplastic is selected from polyethylene, polyester, polyimide, or any combination thereof.

Item 6. The polymer sheet according to item 5, wherein the polyethylene includes ultra-high molecular weight polyethylene.

Item 7. The polymer sheet according to item 3, wherein the permanent liner, the release liner, or the adhesive layer has a thickness of at least about 0.01 mm, such as at least about 0.015 mm, at least about 0.02 mm, at least about 0.025 mm, at least about 0.03 mm, at least about 0.035 mm, or at least about 0.04 mm.

Item 8. The polymer sheet according to item 3, wherein the permanent liner, the release liner, or the adhesive layer has a thickness of not greater than about 0.1 mm, such as not greater than about 0.09 mm, not greater than about 0.08 mm, not greater than about 0.075 mm, not greater than about 0.07 mm, not greater than about 0.065 mm, not greater than about 0.06 mm, not greater than about 0.055 mm, or not greater than about 0.05 mm.

Item 9. The polymer sheet according to item 3, wherein the release liner includes a polyester, polyethylene, polypropylene, paper, or any combination thereof.

Item 10. The polymer sheet according to item 3, wherein the topcoat includes an acrylic coating, a polyurethane coating, or a combination thereof.

Item 11. The polymer sheet according to item 10, wherein the polyurethane coating includes a silicone modified polyurethane coating.

Item 12. The polymer sheet according to item 3, wherein the topcoat as thickness of at least about 0.001 mm, such as at least about 0.002 mm, at least about 0.003 mm, or at least about 0.004 mm.

Item 13. The polymer sheet according to item 3, wherein the topcoat has a thickness of not greater than about 0.01 mm, such as not greater than about 0.009 mm, not greater than about 0.008 mm, not greater than about 0.007 mm, not greater than about 0.006 mm, or not greater than about 0.005 mm.

Item 14. The polymer sheet according to item 3, wherein the adhesive is a pressure sensitive adhesive selected from an acrylic adhesive, a silicon adhesive, a rubber hot melt adhesive, an acrylic copolymer, a rubber acrylic copolymer, or any combination thereof.

Item 15. The polymer sheet according to item 1, wherein the polymer sheet is in form of a roll.

Item 16. The polymer sheet according to item 15, wherein the roll has a diameter of at least about 0.1 m, such as at least about 0.3 m, at least about 0.5 m, at least about 0.8 m, at least about 0.9 m, at least about 1.0 m, at least about 1.1 m, at least about 1.2 m, or at least about 1.3 m.

Item 17. The polymer sheet according to item 15, wherein the roll has a diameter of not greater than about 2.0 m, such as not greater than about 1.9 m, not greater than about 1.8 m, not greater than about 1.7 m, not greater than about 1.6 m, or not greater than about 1.5 m.

Item 18. An assembly comprising:
a first member and a second member; and
a gasket compressed between the first member and the second member, wherein the gasket includes a polyurethane core, having a first major surface and a second major surface opposite the first major surface; and
the gasket is compressed between the first and the second member at a compression of at least about 10%,
wherein the polyurethane core comprises a polyurethane polymer, wherein the polyurethane core has at least one of the following properties:
(i) a Scratch Resistance Rating of not greater than about 10 wt %,
(ii) an elongation at break of at least 200%,
(iii) a tensile strength at break of at least 0.3 MPa,
(iv) a loss of tensile strength of not greater than 30% when exposed to UV light according to standard SAE J1960 (Rev. August 2003).

Item 19. The assembly according to item 18, wherein the assembly is an electronic device and the first member and the second member are components of the electronic device.

Item 20. The assembly according to item 19, wherein the components are selected from a circuit, a display part, an electronic screen, an electronic screen cover, a frame, a housing part, or any combination thereof.

Item 21. The assembly according to item 19, wherein the at least one of the components is an electronic screen, the electronic screen including diodes.

Item 22. The assembly according to item 21, wherein the diodes include LEDs or LCDs.

Item 23. The assembly according to item 18, wherein the compression is at least about 10%, such as at least about 20%, at least about 25%, at least about 30%, at least about 35%, at least about 40%, at least about 45%, at least about 50%, at least about 55%, at least about 60%, at least about 65%, at least about 70%, or at least about 75%.

Item 24. The assembly according to item 18, wherein the compression is not greater than about 90%, such as not greater than about 85%, not greater than about 80%, not greater than about 75%, not greater than about 70%, not greater than about 65%, not greater than about 60%, not greater than about 55%, not greater than about 50%, not greater than about 45%, or not greater than about 45%.

Item 25. The polymer sheet or the assembly according to any one of items 1 through 24, wherein the polyurethane core has a thickness of at least about 0.2 mm, such as at least about 0.4 mm, at least about 0.6 mm, at least about 0.8 mm, at least about 1.0 mm, at least about 1.2 mm, at least about 1.4 mm, at least about 1.6 mm, at least about 1.8 mm, at least about 2.0 mm, or at least about 2.2 mm.

Item 26. The polymer sheet or the assembly according to any one of items 1 through 24, wherein the polyurethane core has a thickness of not greater than about 3.0 mm, such as not greater than about 2.8 mm, not greater than about 2.6 mm, not greater than about 2.4 mm, not greater than about 2.2 mm, not greater than about 2.0 mm, not greater than about 1.8 mm, or not greater than about 1.6 mm.

Item 27. The polymer sheet or the assembly according to any one of items 1 through 24, wherein the polyurethane core has multiple layers.

Item 28. The polymer sheet or the assembly according to any one of items 1 through 24, wherein the Scratch Resistance Rating is not greater than about 10 wt %, such as not greater than about 8 wt %, not greater than about 6 wt %, not greater than about 5 wt %, not greater than about 4 wt %, or not greater than about 2 wt %.

Item 29. The polymer sheet or the assembly according to any one of items 1 through 24, wherein the Elongation at Break is at least about 200%, such as at least about 300%, at least about 400%, at least about 500%, at least about 600%, at least about 700%, at least about 800%, at least about 900%, at least about 1000%, at least about 1200%, at least about 1400%, at least about 1600%, or at least about 1800%.

Item 30. The polymer sheet or the assembly according to any one of items 1 through 24, wherein the tensile strength at break is at least about 0.5 MPa, such as at least about 0.7 MPa, at least about 1 MPa, at least about 1.5 MPa, at least about 2 MPa, at least about 2.5 MPa, at least about 3 MPa, at least about 3.5 MPa, at least about 4 MPa, at least about 4.5 MPa, at least about 5 MPa, at least about 5.5 MPa, or at least about 6 MPa.

Item 31. The polymer sheet or the assembly according to any one of items 1 through 24, wherein the loss of tensile strength when exposed to UV light according to standard SAE J1960 (Rev. August 2003) is not greater than about 25%, such as not greater than about 20%, not greater than about 15%, not greater than about 10%, or not greater than about 5%.

Item 32. The polymer sheet or the assembly according to any one of items 1 through 24, wherein the polyurethane core has at least one of the following performance data:
  (i) a compression force deflection at 25% compression of at least 3 kPa;
  (ii) a force to compress at 25% compression of at least 6 kPa and;
  (iii) a recovery time of not greater than 5 seconds according to ASTM D3574
  (iv) a compression set of not greater than 10% after compression of 50% at room temperature for 22 hours according to ASTM D3574.

Item 33. The polymer sheet or the assembly according to item 32, wherein the compression force deflection at 25% compression is at least about 5 kPa, such as at least about 7 kPa, at least about 9 kPa, at least about 11 kPa, at least about 13 kPa, at least about 15 kPa, at least about 17 kPa, at least about 19 kPa, at least about 21 kPa, at least about 23 kPa, at least about 25 kPa, at least about 27 kPa, or at least about 29 kPa.

Item 34. The polymer sheet or the assembly according to item 32, wherein the compression force deflection at 25% compression is not greater than about 35 kPa, such as not greater than about 34 kPa, not greater than about 32 kPa, not greater than about 30 kPa, not greater than about 28 kPa, not greater than about 26 kPa, not greater than about 24 kPa, not greater than about 22 kPa, not greater than about 20 kPa, not greater than about 18 kPa, not greater than about 16 kPa, not greater than about 14 kPa, not greater than about 12 kPa, or not greater than about 10 kPa.

Item 35. The polymer sheet or the assembly according to item 32, wherein the force to compress at 25% compression is at least about 7 kPa, such as at least about 9 kPa, at least about 11 kPa, at least about 13 kPa, at least about 15 kPa, at least about 17 kPa, at least about 19 kPa, at least about 21 kPa, at least about 23 kPa, at least about 25 kPa, at least about 27 kPa, at least about 29 kPa, at least about 31 kPa, at least about 33 kPa, at least about 35 kPa, at least about 37 kPa, at least about 39 kPa, at least about 41 kPa, at least about 43 kPa, or at least about 45 kPa.

Item 36. The polymer sheet or the assembly according to item 32, wherein the force to compress at 25% compression is not greater than about 50 kPa, such as not greater than about 48 kPa, not greater than about 46 kPa, not greater than about 44 kPa, not greater than about 42 kPa, not greater than about 40 kPa, not greater than about 38 kPa, not greater than about 36 kPa, not greater than about 34 kPa, not greater than about 32 kPa, not greater than about 30 kPa, not greater than about 28 kPa, not greater than about 26 kPa, not greater than about 24 kPa, not greater than about 22 kPa, not greater than about 20 kPa, not greater than about 18 kPa, not greater than about 16 kPa, not greater than about 14 kPa, or not greater than about 12 kPa.

Item 37. The polymer sheet or the assembly according to item 32, wherein the recovery time from 50% compression is not greater than 4 seconds, not greater than 3 seconds, or not greater than 2 seconds.

Item 38. The polymer sheet or the assembly according to item 32, wherein the compression set is not greater than about 8%, such as not greater than about 7%, not greater than about 6%, not greater than about 5%, not greater than about 4%, not greater than about 3%, or not greater than about 2%.

Item 39. The polymer sheet or the assembly according to any one of items 1 through 24, wherein the polyurethane polymer comprises a crosslinker.

Item 40. The polymer sheet or the assembly according to item 39, wherein the crosslinker is a melamine-based crosslinker, an isocyanate-based crosslinker, or a polyaziridine based crosslinker.

Item 41. The polymer sheet or the assembly according to item 40, wherein the melamine-based crosslinker is melamine resin.

Item 42. The polymer sheet or the assembly according to any one of items 1 through 24, wherein the polyurethane core has a density of at least 50 kg/m$^3$, such as at least about 60 kg/m$^3$, at least about 70 kg/m$^3$, at least about 80 kg/m$^3$, at least about 90 kg/m$^3$, at least about 100 kg/m$^3$, at least about 120 kg/m$^3$, at least about 140 kg/m$^3$, at least about 160 kg/m$^3$, at least about 180 kg/m$^3$, or at least about 200 kg/m$^3$.

Item 43. The polymer sheet or the assembly according to any one of items 1 through 24, wherein the polyurethane core has a density of not greater than about 900 kg/m³, such as not greater than about 800 kg/m³, not greater than about 700 kg/m³, not greater than about 600 kg/m³, not greater than about 500 kg/m³, not greater than about 450 kg/m³, not greater than about 400 kg/m³, not greater than about 350 kg/m³, not greater than about 330 kg/m³, not greater than about 310 kg/m³, not greater than about 290 kg/m³, not greater than about 270 kg/m³, not greater than about 250 kg/m³, not greater than about 230 kg/m³, not greater than about 210 kg/m³, not greater than about 190 kg/m³, not greater than about 170 kg/m³, not greater than about 150 kg/m³, not greater than about 130 kg/m³, or not greater than about 110 kg/m³.

Item 44. The polymer sheet or the assembly according to any one of items 1 through 24, wherein the polyurethane core comprises cells, wherein at least 50% of the cells have a cell diameter of at least about 30 microns, such as at least about 40 microns, at least about 50 microns, at least about 60 microns, at least about 70 microns, at least about 80 microns, at least about 90 microns, at least about 100 microns, at least about 120 microns, and not greater than about 160 microns.

Item 45. The polymer sheet or the assembly according to any one of items 1 through 24, wherein the polyurethane core comprises cells, wherein at least 50% of the cells have a cell diameter of, not greater than about 160 microns, not greater than about 140 microns, not greater than about 120 microns, not greater than about 100 microns, not greater than about 90 microns, not greater than about 80 microns, not greater than about 70 microns, or not greater than about 60 microns.

Item 46. The polymer sheet or the assembly according to any one of items 1 through 24, wherein the polyurethane core further comprises a surfactants, a pigment, a flame retardant, a thickener, a filler, or any combination thereof.

Item 47. The polymer sheet or the assembly according to item 46, wherein the filler is selected from the group consisting of bentonite, kaolin, powdered glass, glass beads, glass fibers, calcium carbonate, quartz sand, fluoropolymer, thermoplastic, microspheres, and any combination thereof.

Item 48. The polymer sheet or the assembly according to item 46, wherein the surfactant is selected from the group consisting of ether sulfates, fatty alcohol sulfates, sarcosinates, organic amine oxides, sulfonates, betaines, organic acid amides, sulfosuccinates, sulfonic acids, alkanolamides, ethoxylated fatty alcohols, sorbinates, silicon surfactant, and any combination thereof.

Item 49. The polymer sheet or the assembly according to any one of items 1 through 24, wherein the polyurethane core further comprises a catalyst in an amount of not greater than about 0.3 wt %, such as not greater than 0.2 wt %, not greater than 0.1 wt %, not greater than 0.05 wt %, not greater than 0.01 wt %, not greater than 0.005 wt %, not greater than 0.001 wt %, not greater than 0.0005 wt %, or not greater than 0.0001 wt %.

Item 50. The polymer sheet or the assembly according to item 49, wherein the catalyst is selected from the group consisting of triethylamine, tributylamine, N-methylmorpholine, N-ethylmorpholine, N,N,N',N'-tetramethylethylenediamine, pentamethyl-diethylenetriamine, 1,4-diazabicyclo(2.2.2)octane, N-methyl-N'-dimethylaminoethylpiperazine, bis-(dimethylaminoalkyl) piperazines, N,N-dimethylbenzylamine, N,N-dimethylcyclohexylamine, N,N-diethylbenzylamine, bis-(N,N-diethylaminoethyl)adipate, N,N,N',N'-tetramethyl-1,3-butanediamine, N,N-dimethyl-β-phenylethylamine, 1,2-dimethylimidazole, 2-methylimidazole, 2,2-bis-(dimethylaminoethyl)ether, di-n-octyltin mercaptide, tin(II) acetate, tin(II) octoate, tin(II) ethylhexoate, tin(II) laurate, dibutyltin (IV) oxide, dibutyltin(IV) dichloride, dibutyltin(IV) diacetate, dibutyltin(IV) dilaurate, dibutyltin(IV) maleate, and dioctyltin(IV) diacetate.

Item 51. The polymer sheet or the assembly according to any one of items 1 through 24, wherein the polyurethane core is based on a polyurethane dispersion.

Item 52. The polymer sheet or the assembly according to item 51, wherein the polyurethane dispersion is selected from an aliphatic polyester polyurethane dispersions, an aliphatic polyether polyurethane dispersions, an aliphatic polycarbonate ester polyether polyurethane dispersions, a polycarbonate polyurethane dispersions, or any combination thereof.

Item 53. The polymer sheet or the assembly according to item 51, wherein the polyurethane dispersion have a solid content of at least about 50% to about 60%.

Item 54. The polymer sheet or the assembly according to any one of items 1 through 24, wherein the polyurethane core is formed from a polyurethane dispersion.

Item 55. The polymer sheet or the assembly according to item 54, wherein the polyurethane dispersion is selected from the group of an anionic aliphatic polyester polyurethane dispersion, an anionic aliphatic polyether polyurethane dispersion, an aliphatic polycarbonate ester polyether polyurethane dispersions, an anionic polycarbonate polyurethane dispersions, or any combination thereof.

Item 56. The polymer sheet or the assembly according to any one of items 1 through 24, wherein the polyurethane core has a discoloration ΔE of not greater than 4.0, such as at not greater than 3.8, not greater than 3.6, not greater than 3.4, not greater than 3.2, not greater than 3.0, not greater than 2.8, not greater than 2.6, not greater than 2.4, not greater than 2.2, not greater than 2.0, not greater than 1.8, not greater than 1.6, or not greater than 1.4.

Item 57. The polymer sheet or the assembly according to any one of items 1 through 24, wherein the polyurethane core has a yellowing Δb of not greater than 5, such as not greater than 4, not greater than 3, not greater than 2, not greater than 1.5, not greater than 1.4, not greater than 1.3, not greater than 1.2, not greater than 1.1, or not greater than 1.0.

Item 58. The polymer sheet or the assembly according to item 57, wherein the polyurethane core is free of pigment.

Item 59. The polymer sheet or assembly of item 58, wherein the at least one functional layer is visually transparent.

Item 60. A method of preparing a polymer sheet, the method comprising
  frothing a polyurethane dispersion into a froth;
  casting the froth onto a liner;
  treating the froth to have a uniform thickness;
  drying the froth to form a polyurethane core having a thickness $t_{PF}$ and $t_{PF}$ being at least 0.5 of a total thickness of the polymer sheet,
wherein the polyurethane core comprises polyurethane polymer, wherein the polyurethane core has at least one of the following property:
  (i) a Scratch Resistance Rating of not greater than about 10 wt %,
  (ii) an elongation at break of at least 200%,
  (iii) a tensile strength at break of at least 0.3 MPa, (iv) a loss of tensile strength of not greater than about 30% when exposed to UV light according to standard SAE J1960 (Rev. August 2003).

Item 61. The method according to item 60 further comprising casting a topcoat layer onto the foam polymer.

Item 62. The method according to item 61, wherein the topcoat includes an acrylic coating, a polyurethane coating, or a combination thereof.

Item 63. The method according to item 62, wherein the polyurethane coating includes a silicone modified polyurethane coating.

Item 64. The method according to item 61, wherein the topcoat as thickness of at least about 0.001 mm, such as at least about 0.002 mm, at least about 0.003 mm, or at least about 0.004 mm.

Item 65. The method according to item 61, wherein the topcoat has a thickness of not greater than about 0.01 mm, such as not greater than about 0.009 mm, not greater than about 0.008 mm, not greater than about 0.007 mm, not greater than about 0.006 mm, or not greater than about 0.005 mm.

Item 66. The method according to item 60 further comprising applying a film onto the foam polymer.

Item 67. The method according to item 66, wherein the film includes a thermoplastic.

Item 68. The method according to item 67, wherein the thermoplastic is selected from polyethylene, polyester, polyimide, or any combination thereof.

Item 69. The method according to item 68, wherein the polyethylene includes ultra-high molecular weight polyethylene.

Item 70. The method according to item 66, wherein the film has a thickness of at least about 0.01 mm, such as at least about 0.015 mm, at least about 0.02 mm, at least about 0.025 mm, at least about 0.03 mm, at least about 0.035 mm, or at least about 0.04 mm.

Item 71. The method according to item 66, wherein the film has a thickness of not greater than about 0.1 mm, such as not greater than about 0.09 mm, not greater than about 0.08 mm, not greater than about 0.075 mm, not greater than about 0.07 mm, not greater than about 0.065 mm, not greater than about 0.06 mm, not greater than about 0.055 mm, or not greater than about 0.05 mm.

Item 72. The method according to item 66, further comprising casting a second froth layer onto the film.

Item 73. The method according to item 60, wherein frothing includes mechanical frothing, or gas frothing, Item 74. The method according to item 73, wherein the gas frothing includes blowing with a gas or a blowing agent.

Item 75. The method according to item 74, wherein the gas is selected from air, nitrogen, an inert gas, or any combination thereof.

Item 76. The method according to item 74, wherein the blowing agent includes a hydrohalocarbon.

Item 77. The method according to any one of items 60 through 76, wherein the polyurethane dispersion further comprises a surfactants, a pigment, a flame retardant, a thickener, a filler, or any combination thereof.

Item 78. The method according to item 77 wherein the filler is selected from the group consisting of bentonite, kaolin, powdered glass, glass beads, glass fibers, calcium carbonate, quartz sand, fluoropolymer, thermoplastic, microspheres, and any combination thereof.

Item 79. The method according to item 77, wherein the surfactant is selected from the group consisting of ether sulfates, fatty alcohol sulfates, sarcosinates, organic amine oxides, sulfonates, betaines, organic acid amides, sulfosuccinates, sulfonic acids, alkanolamides, ethoxylated fatty alcohols, sorbinates, silicon surfactant, and any combination thereof.

Item 80. The method according to any one of items 60 through 76, wherein the froth has a froth density of at least about 100 g/L, such as at least about 110 g/L, at least about 120 g/L, at least about 130 g/L, at least about 140 g/L, at least about 150 g/L, at least about 170 g/L, at least about 190 g/L, at least about 210 g/L, at least about 230 g/L, or at least about 250 g/L.

Item 81. The method according to any one of items 60 through 76, wherein the froth has a froth density of not greater than about 1200 g/L, such as not greater than about 1100 g/L, not greater than about 1000 g/L, not greater than about 900 g/L, not greater than about 800 g/L, not greater than about 700 g/L, not greater than about 600 g/L, not greater than about 500 g/L, not greater than about 400 g/L, or not greater than about 300 g/L.

Item 82. The method according to any one of items 60 through 76, further comprising drying the froth at a temperature of at least about 50° C., such as at least about 60° C., at least about 70° C., at least about 80° C., at least about 90° C., at least about 100° C., at least about 110° C., at least about 120° C., or at least about 130° C.

Item 83. The method according to item 82, wherein the temperature is not greater than about 180° C., such as not greater than about 170° C., not greater than about 160° C., or not greater than about 150° C.

Item 84. The method according to any one of items 60 through 76, wherein the froth has a viscosity of not greater than about 18000 cps, such as not greater than about 17000 cps, not greater than about 16000 cps, not greater than about 15000 cps, not greater than about 14000 cps, not greater than about 13000 cps, not greater than about 12000 cps, not greater than about 11000 cps, not greater than about 10000 cps, not greater than about 9000 cps, not greater than about 8000 cps, not greater than about 7000 cps, not greater than about 6000 cps, or not greater than about 5000 cps.

Item 85. The method according to any one of items 60 through 76, wherein the froth has a viscosity of at least about 800 cps, such as at least about 900 cps, at least about 1000 cps, at least about 1500 cps, at least about 2000 cps, at least about 2500 cps, at least about 3000 cps, at least about 3500 cps, or at least about 4000 cps.

The invention claimed is:

1. A polymer sheet comprising:
a polyurethane core, having a first major surface and a second major surface opposite the first major surface; and
at least one functional layer;
wherein the polymer sheet has a thickness tPS and the polyurethane core has a thickness tPC,
wherein tPC is at least 0.3 tPS,
wherein the polyurethane core comprises polyurethane polymer, and
wherein the polyurethane core has a loss of tensile strength when exposed to UV light according to standard SAE J1960 (Rev. August 2003) of not greater than 30%.

2. The polymer sheet according to claim 1, wherein the polymer sheet has a primary aspect ratio of at least 400.

3. The polymer sheet according to claim 1, wherein the functional layer is selected from the group consisting of a permanent liner, a release liner, a topcoat, and an adhesive.

4. The polymer sheet according to claim 1, wherein the functional layer comprises a permanent liner, and the permanent liner comprises a thermoplastic selected from the group consisting of polyethylene, polyester, and polyimide.

5. The polymer sheet according to claim 1, wherein the functional layer comprises a permanent liner, and the permanent liner comprises ultra-high molecular weight polyethylene.

6. The polymer sheet according to claim 1, wherein the functional layer is selected from the group consisting of a permanent liner, a release liner, and an adhesive layer, and wherein the functional layer has a thickness of in a range of from 0.01 mm to 0.1 mm.

7. The polymer sheet according to claim 1, wherein the functional layer is a release liner, and wherein the release liner includes a-polyester, polyethylene, polypropylene, or paper.

8. The polymer sheet according to claim 1, wherein the functional layer is a topcoat, and wherein the topcoat has a thickness in a range of from 0.001 mm to 0.01 mm.

9. The polymer sheet according to claim 1, wherein the functional layer is a pressure sensitive adhesive selected from the group consisting of an acrylic adhesive, a silicon adhesive, a rubber hot melt adhesive, an acrylic copolymer, and a rubber acrylic copolymer.

10. The polymer sheet according to claim 1, wherein the polymer sheet is in a form of a roll.

11. The polymer sheet according to claim 1, wherein the polyurethane core has a thickness in a range of from 0.2 mm to 3.0 mm.

12. The polymer sheet according to claim 1, wherein the loss of tensile strength when exposed to UV light according to standard SAE J1960 (Rev. August 2003) is not greater than 25%.

13. The polymer sheet according to claim 1, wherein the polyurethane core has a compression force deflection at 25% compression of at least 3 kPa.

14. The polymer sheet according to claim 1, wherein the polyurethane core when exposed to UV light according to standard SAE J1960 (Rev. August 2003) has a discoloration ΔE of not greater than 4.0.

15. The polymer sheet according to claim 1, wherein the polyurethane core when exposed to UV light according to standard SAE J1960 (Rev. August 2003) has a yellowing Δb of not greater than 2.

16. The polymer sheet according to claim 1, wherein the polyurethane core is free of pigment.

17. A method of preparing a polymer sheet, the method comprising:
frothing a polyurethane dispersion into a froth;
casting the froth onto a liner;
treating the froth to have a uniform thickness;
drying the froth to form a polyurethane core having a thickness of at least 0.5 of a total thickness of the polymer sheet,
wherein the polyurethane core comprises polyurethane polymer, wherein the polyurethane core has a loss of tensile strength when exposed to UV light according to standard SAE J1960 (Rev. August 2003) of not greater than about 30%.

18. The method according to claim 17 further comprising casting a topcoat layer onto the polymer sheet, wherein the topcoat layer comprises a polyurethane coating, and wherein the topcoat has a thickness in a range of from 0.001 mm to 0.01 mm.

19. An assembly comprising:
a first member;
a second member; and
a gasket;
wherein the gasket includes a polyurethane core,
wherein the polyurethane core has a first major surface and a second major surface opposite the first major surface,
wherein the gasket is compressed between the first member and the second member at a compression of at least about 10%,
wherein the polyurethane core comprises a polyurethane polymer, and
wherein the polyurethane core has a loss of tensile strength when exposed to UV light according to standard SAE J1960 (Rev. August 2003) of not greater than 30%.

20. The assembly according to claim 19, wherein the assembly is an electronic device and wherein the first member and the second member are components of the electronic device.

* * * * *